(12) United States Patent
Chen et al.

(10) Patent No.: US 7,755,542 B2
(45) Date of Patent: Jul. 13, 2010

(54) GNSS SIGNAL PROCESSING METHODS AND APPARATUS

(75) Inventors: Xiaoming Chen, Hoehenkirchen (DE); Ulrich Vollath, Ismaning (DE)

(73) Assignee: Trimble Navigation Limited, Sunnyvale, CA (US)

(*) Notice: Subject to any disclaimer, the term of this patent is extended or adjusted under 35 U.S.C. 154(b) by 127 days.

(21) Appl. No.: 12/224,451

(22) PCT Filed: Mar. 7, 2007

(86) PCT No.: PCT/US2007/005874

§ 371 (c)(1),
(2), (4) Date: Aug. 26, 2008

(87) PCT Pub. No.: WO2008/008099

PCT Pub. Date: Jan. 17, 2008

(65) Prior Publication Data

US 2009/0027264 A1 Jan. 29, 2009

Related U.S. Application Data

(60) Provisional application No. 60/779,941, filed on Mar. 7, 2006.

(51) Int. Cl.
G01S 19/07 (2010.01)
G01S 19/40 (2010.01)
G01S 19/41 (2010.01)

(52) U.S. Cl. .................. 342/357.12; 342/357.03; 342/358

(58) Field of Classification Search ............ 342/357.03, 342/357.04, 357.12, 358
See application file for complete search history.

(56) References Cited

U.S. PATENT DOCUMENTS

| 5,323,322 A * | 6/1994 | Mueller et al. ......... 342/357.03 |
| 5,477,458 A | 12/1995 | Loomis |
| 5,899,957 A | 5/1999 | Loomis |
| 2005/0080560 A1 | 4/2005 | Hatch |
| 2005/0101248 A1 | 5/2005 | Vollath |

OTHER PUBLICATIONS

B. Hofmann-Wellenhof et al., Global Positioning System: Theory and Practice, 2d Ed., 1993, section 6.3.3, pp. 98-106.
N. Carlson, Federated Square Root Filter for Decentralized Parallel Processes, IEEE Transactions on Aerospace and Electronic Systems., vol. 26, No. 3, May 1990, pp. 517-525.
G. Minkler et al., Theory and Application of Kalman Filtering, pp. 473-505 and pp. 567-585.
P. Misra et al., Global Positioning System: Signals, Measurements, and Performance, 2001, pp. 145-151.
Kolb et el., A New Method to Model the Ionosphere Across Local Area Networks, ION GNSS 18th International Technical Meeting of the Satellite Division, Sep. 13-16, 2005, Long Beach, CA, pp. 705-711.

* cited by examiner

*Primary Examiner*—Thomas H Tarcza
*Assistant Examiner*—Fred H Mull
(74) *Attorney, Agent, or Firm*—Bruce D Riter

(57) ABSTRACT

Methods and apparatus for processing of data from a network of GNSS reference stations are presented. An ionosphere-free, federated geometry filter is employed so that computation time increases only linearly with the increase in number of reference stations, significantly reducing processing time as compared to a centralized filter approach.

27 Claims, 19 Drawing Sheets

GNSS SIGNAL PROCESSING METHODS AND APPARATUS

I. CROSS REFERENCE TO RELATED APPLICATIONS

Provisional U.S. Patent Application No. 60/779,941 filed Mar. 7, 2006, U.S. patent application Ser. No. 10/696,528 filed Oct. 28, 2003 (published May 12, 2005 as US2005/0101248 A1) and Provisional U.S. Patent Application No. 60/715,752 filed Sep. 9, 2005, all of which are incorporated herein by this reference.

II. TECHNICAL FIELD

The present invention relates to the field of Global Navigation Satellite Systems. More particularly, the present invention relates to processing of data received at multiple reference stations in a network of reference stations.

III. BACKGROUND ART

Global Navigation Satellite Systems (GNSS) include the Global Positioning System (GPS), the Glonass system, and the proposed Galileo system. Each GPS satellite transmits continuously using two radio frequencies in the L-band, referred to as L1 and L2, at respective frequencies of 1575.41 MHz and 1227.60 MHz. Two signals are transmitted on L1, one for civil users and the other for users authorized by the United States Department of Defense (DoD). One signal is transmitted on L2, intended only for DoD-authorized users. Each GPS signal has a carrier at the L1 and L2 frequency, a pseudo-random number (PRN) code, and satellite navigation data. Two different PRN codes are transmitted by each satellite: a coarse acquisition (C/A) code and a precision (P/Y) code which is encrypted for DoD-authorized users. Each C/A code is a unique sequence of 1023 bits, which is repeated each millisecond.

FIG. 1 schematically illustrates a typical prior-art scenario to determine the position of a mobile receiver (rover). Rover 100 receives GPS signals from any number of satellites in view, such as SV1, SV2, and SVM, shown respectively at 110, 120 and 130. The signals pass through the earth's ionosphere 140 and through the earth's troposphere 150. Each signal has two frequencies, L1 and L2. Receiver 100 determines from the signals respective pseudo-ranges, PR1, PR2, ..., PRM, to each of the satellites. Pseudo-range determinations are distorted by variations in the signal paths which result from passage of the signals through the ionosphere 140 and the troposphere 150, and from multipath effects, as indicated schematically at 160.

Pseudo-range can be determined using the C/A code with an error of about one meter, a civil receiver not using the military-only P/Y code determines rover position with an error in the range of meters. However, the phases of the L1 and L2 carriers can be measured with an accuracy of 0.01-0.05 cycles (corresponding to pseudo-range errors of 2 mm to 1 cm), allowing relative position of the rover to be estimated with errors in the range of millimeters to centimeters. Accurately measuring the phase of the L1 and L2 carriers requires a good knowledge of the effect of the ionosphere and the troposphere for all observation times.

Network solutions using multiple reference stations of known location allow correction terms to be extracted from the signal measurements; those corrections can be interpolated to all locations within the network. See for example U.S. Pat. No. 5,477,458 "Network for Carrier Phase Differential GPS Corrections" and U.S. Pat. No. 5,899,957 "Carrier Phase Differential GPS Corrections Network."

FIG. 2 illustrates a network technique in which N ground-based reference stations of known location 211, 212, 213, 21N receive GNSS signals from M satellites 221, 222, ..., 22M. The GNSS signals are perturbed by the ionosphere 230, by the troposphere 235 and by multipath effects. Each reference station n knows its own location precisely, and uses GNSS signal measurements of the current epoch and its known location to calculate a residual error with respect to each satellite m. In this way each reference station n obtains a pseudorange correction (PRC(t; $t_0$; n; m)) for each observed satellite m. These corrections are transmitted to a central station 240 which lies within or outside of the network. Central station 240 calculates pseudorange corrections for a location close to the rover's last position and sends these to the rover. The rover can use the pseudorange corrections to improve its current position estimate.

A conventional approach to processing of data from the network reference station is to apply the reference-station data to a centralized Kalman filter having a large number of states. A disadvantage of this approach is that processing times are long, and become impractical for real-time estimation of network corrections as the number of reference stations and Kalman filter states become very large.

U.S. Patent Application Publication 2005/0101248 A1 describes techniques which employ factorized processing of GNSS signal data. The processing is divided between separate filters which include a single geometry filter and a bank of geometry-free filters. In these techniques, all the geometric-related information, such as ionospheric-free carrier-phase ambiguities from all reference stations and satellites, tropospheric effect, orbit error, receiver and satellite clock errors are estimated in a single, large, centralized Kalman filter. Although this approach provides an optimal solution to the estimation problem, the processing time increases cubically with the number of reference stations in the network. Currently a single personal computer can only process data in real time from a network having no more than fifty reference stations.

IV. DISCLOSURE OF INVENTION

Improved methods and apparatus for processing of data from a network of GNSS reference stations are presented. An ionosphere-free, federated geometry filter is employed so that computation time increases only linearly with the increase in number of reference stations, significantly reducing processing time as compared to a centralized filter approach.

An embodiment of the invention provides a method of processing a set of GNSS signal data received from multiple satellites at multiple reference stations, comprising: for each reference station, applying to the GNSS signal data a station geometry filter to estimate values for local states representing parameters unique to that reference station and for common states representing parameters common to all reference stations, providing values for the common states and their covariance to a master filter, and preparing updated estimates for the local states when updated values for the common states are provided by a master filter; and applying to the values for the common states and their covariances a master filter to estimate updated values for the common states, and to provide the updated values to the station geometry filters. The common states may comprise a satellite-clock error for each satellite and the local states comprise a tropospheric scaling factor, a reference-station clock error, and an iono-free ambiguity for each satellite.

An embodiment of the method may further comprise: applying to the GNSS signal data from a subset of the reference stations a frame filter to estimate values for frame filter system states representing at least one of: (i) a troposcaling vector having a troposcaling state for each reference station of a subset of the reference stations, (ii) a receiver clock error vector having a receiver clock error state for each reference station of the subset, (iii) an ambiguity vector having an ambiguity state for each satellite for each reference station of the subset, (iv) a satellite clock error vector having a clock error state for each satellite, and (v) an orbit error vector having a set of orbit error states for each satellite; and supplying at least a subset of these values to the station geometry filters.

In an embodiment of the method, the frame filter supplies estimated satellite-orbit error vector values to the station geometry filters. In another embodiment, during each of a plurality of epochs the station geometry filters apply the satellite-orbit error values as a correction before estimating values for the local states and the common states. In a further embodiment, the frame filter supplies estimated troposcaling values to the station geometry filters, e.g., during a number of initial epochs of operation of the station geometry filters. Another embodiment further comprises combining state values from the station geometry filters to obtain an array of ionosphere-free ambiguity estimates and associated statistical information.

An embodiment of the method may further comprise: forming a geometry-free combination of the GNSS signal data; applying a bank of geometry-free filters to the geometry-free combination to obtain geometry-free ambiguity estimates and associated statistical information; and combining the ionosphere-free ambiguity estimates and associated statistical information with the geometry-free ambiguity estimates and associated statistical information to determine a combined array of ambiguity estimates and associated statistical information.

An embodiment of the method may further comprise: forming a geometry-free combination of the GNSS signal data; applying a bank of geometry-free filters to the geometry-free combination to obtain geometry-free ambiguity estimates and associated statistical information; applying at least one code filter to the GNSS signal data using a plurality of geometry-free code-carrier combinations to obtain ambiguity estimates for the code-carrier combinations and associated statistical information; and combining the ionosphere-free ambiguity estimates and associated statistical information with the geometry-free ambiguity estimates and associated statistical information and with the ambiguity estimates for all code-carrier combinations and associated statistical information to determine a combined array of ambiguity estimates and associated statistical information.

An embodiment of the invention may further comprise: forming a geometry-free combination of the GNSS signal data; applying a bank of geometry-free filters to the geometry-free combination to obtain geometry-free ambiguity estimates and associated statistical information; applying at least one code filter to the GNSS signal data using a plurality of geometry-free code-carrier combinations to obtain ambiguity estimates for the code-carrier combinations and associated statistical information; applying at least one quintessence filter to the GNSS signal data using a plurality of geometry-free and ionosphere-free carrier-phase combinations to obtain geometry-free and ionosphere-free ambiguity estimates and associated statistical information; and combining the ionosphere-free ambiguity estimates and associated statistical information with the geometry-free ambiguity estimates and associated statistical information and with the ambiguity estimates for the code-carrier combinations and associated statistical information and with the geometry-free and ionosphere-free ambiguity estimates and associated statistical information to determine a combined array of ambiguity estimates and associated statistical information.

An embodiment of the method may further comprise: computing from the ambiguity estimates for all carrier phase observations a set of errors at the reference stations; generating from the set of errors at the reference stations a set of virtual-reference-station data for use by a GNSS receiver at a mobile GNSS receiver location, and transmitting the set of virtual-reference-station data for use by a GNSS receiver at the mobile GNSS receiver location.

An embodiment of the method may further comprise: combining the combined array of ambiguity estimates with the set of GNSS signal data to produce a set of network broadcast data for use by GNSS receivers within the network area, and transmitting the network broadcast data for use by GNSS receivers within the network area.

Additional embodiments provide apparatus for performing methods in accordance with the invention. Further embodiments provide network correction data streams prepared in accordance with the methods and suitable for broadcast and use by mobile GNSS receivers within a network area. Additional embodiments provide virtual-reference-station correction data sets prepared in accordance with the methods and suitable for use by a GNSS receiver at a mobile GNSS receiver location within the network area.

V. BRIEF DESCRIPTION OF DRAWINGS

These and other aspects and features of the present invention will be more readily understood from the embodiments described below with reference to the drawings, in which:

FIG. 1 schematically illustrates a typical prior-art scenario to determine a rover position;

FIG. 2 schematically illustrates a typical prior-art network positioning scenario;

FIG. 3 schematically illustrates a GNSS signal-processing method in accordance with an embodiment of the invention;

FIG. 4 schematically illustrates an ionospheric shell and a portion of a tropospheric shell surrounding the earth;

FIG. 5 illustrates a slanted ray path from a satellite to a receiver passing through the troposphere;

FIG. 6 schematically illustrates a solution for processing of two-carrier GNSS signal data in accordance with an embodiment the invention;

Figure 12:
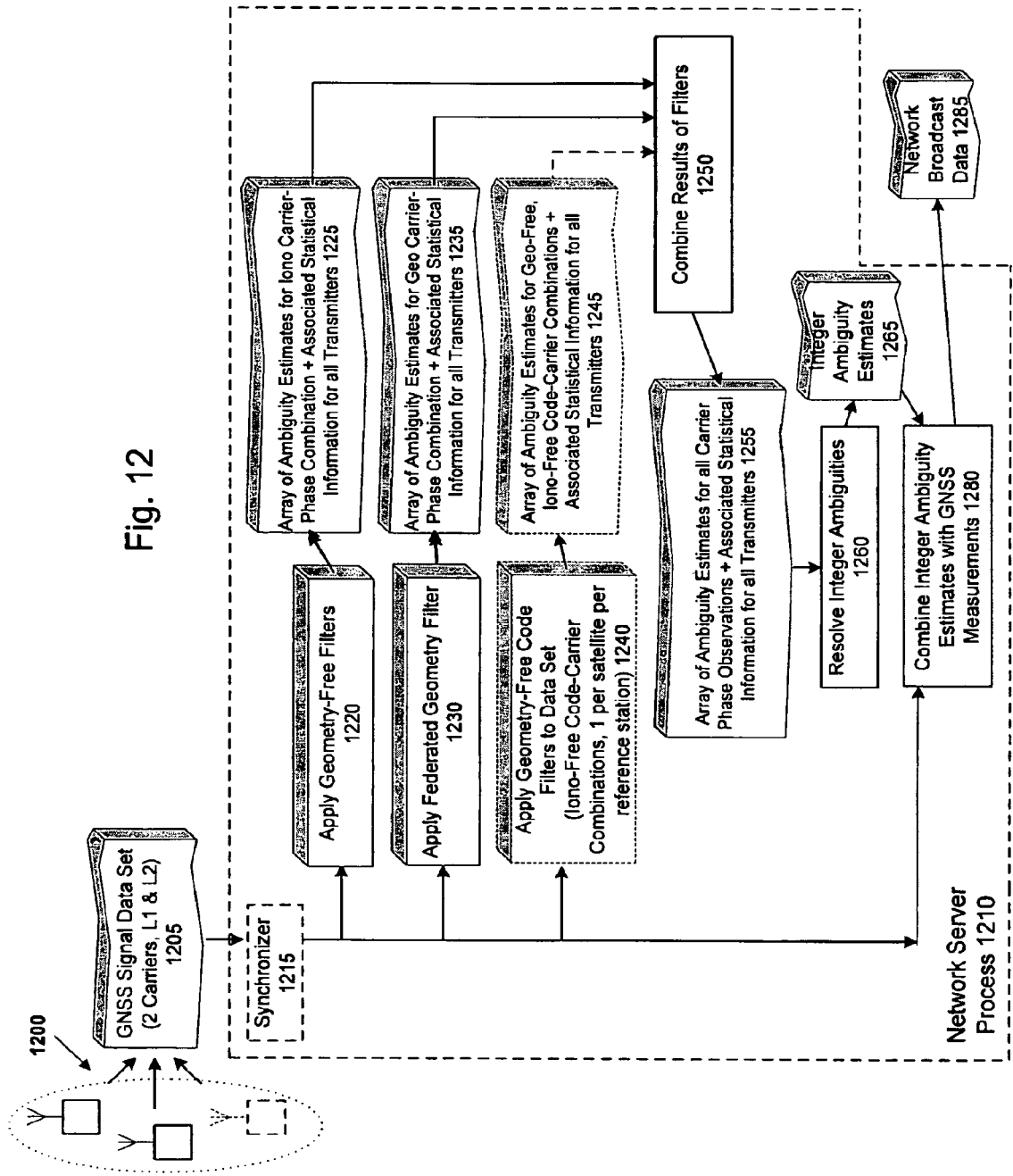
Figure 13:
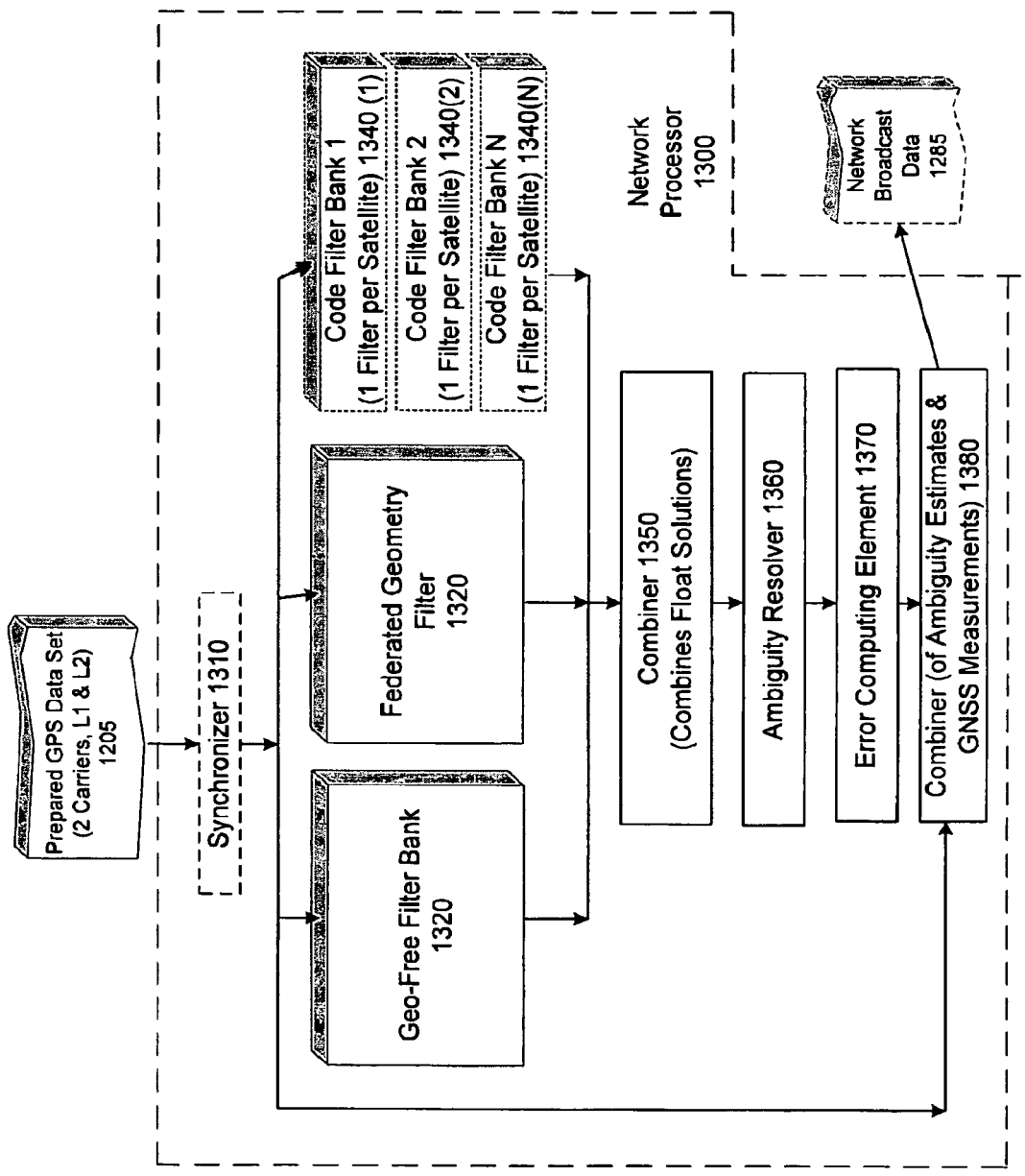
Figure 14:
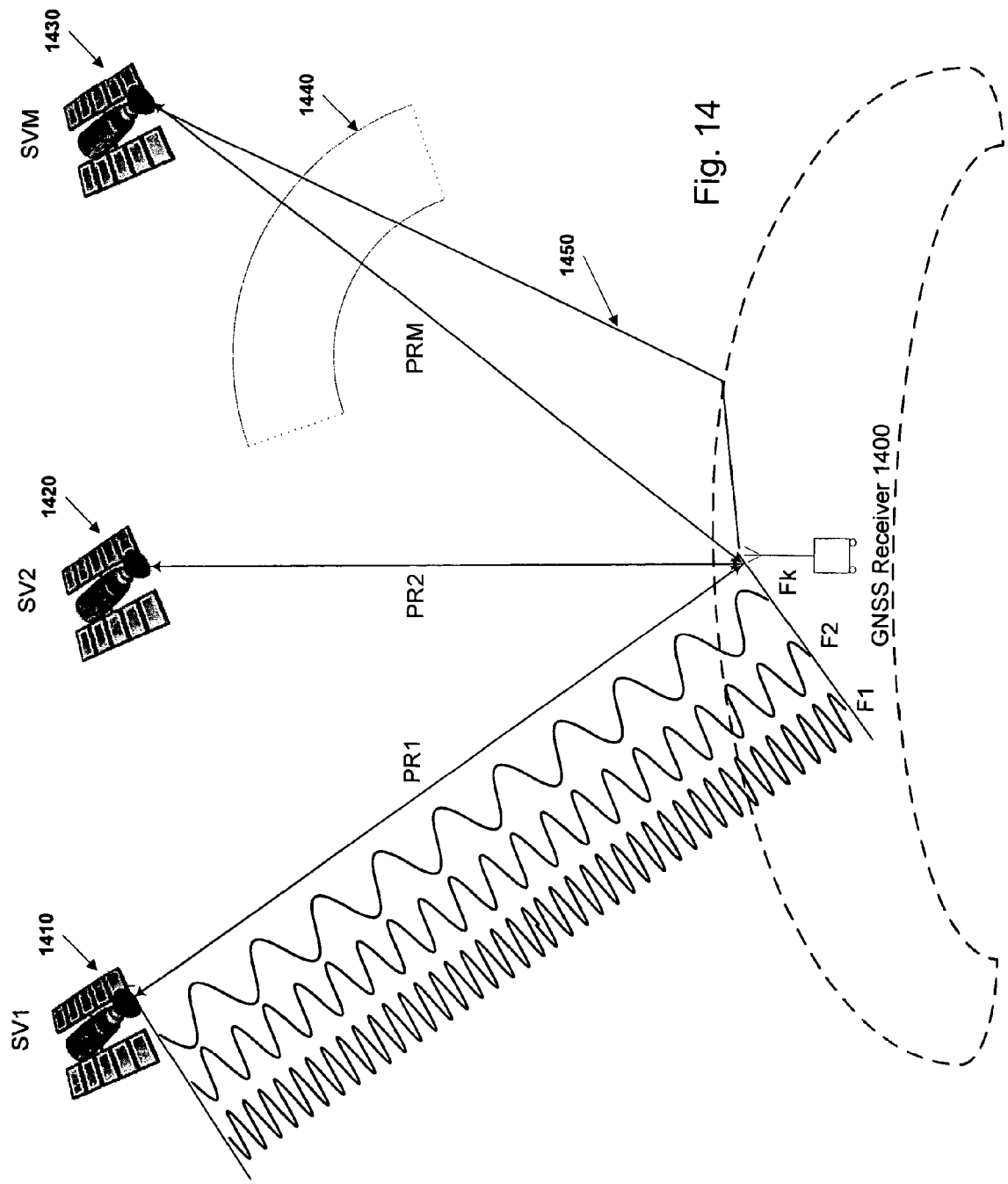
Figure 15:
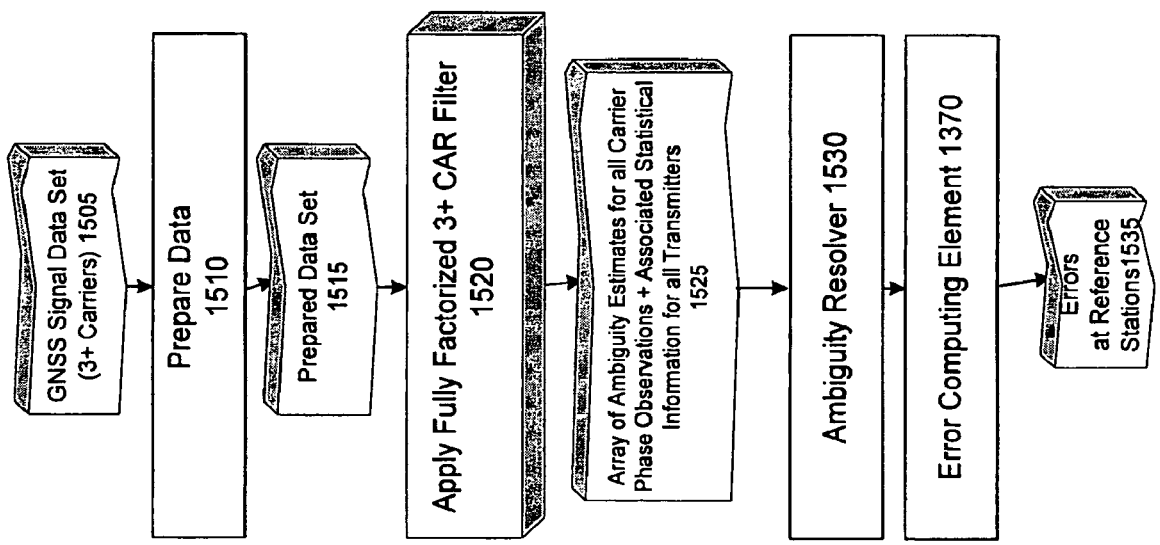
Figure 16:
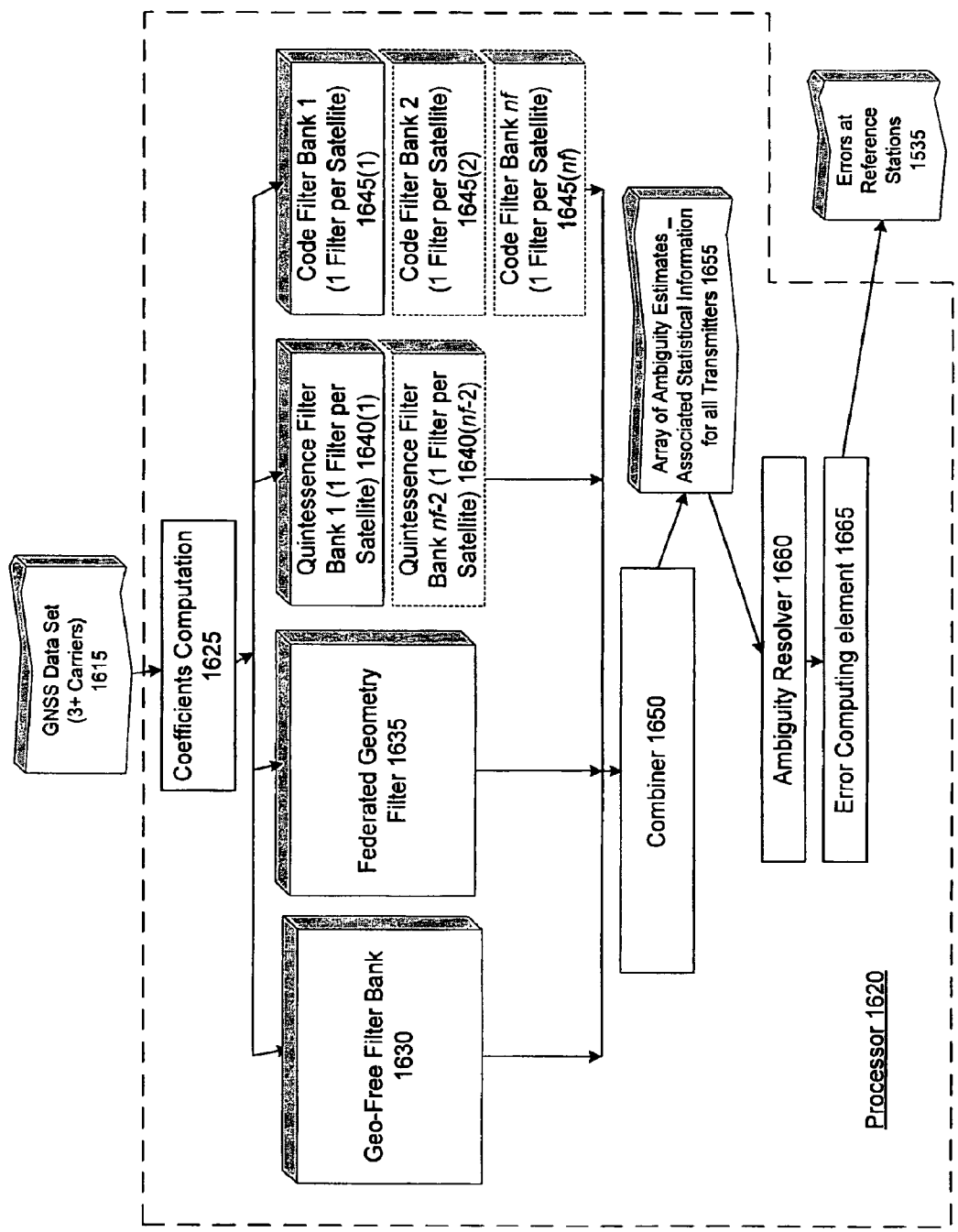
Figure 17:
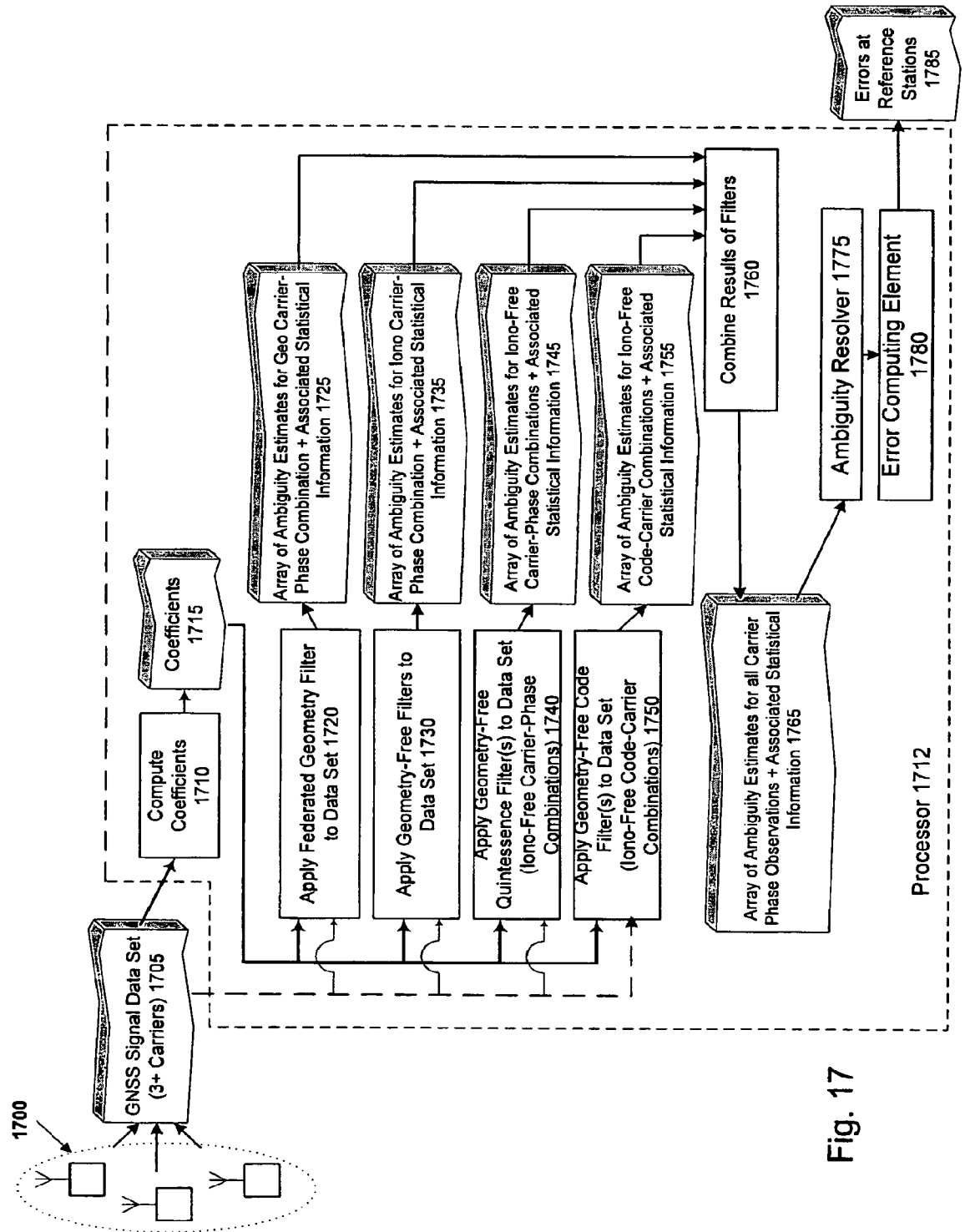
Figure 18:
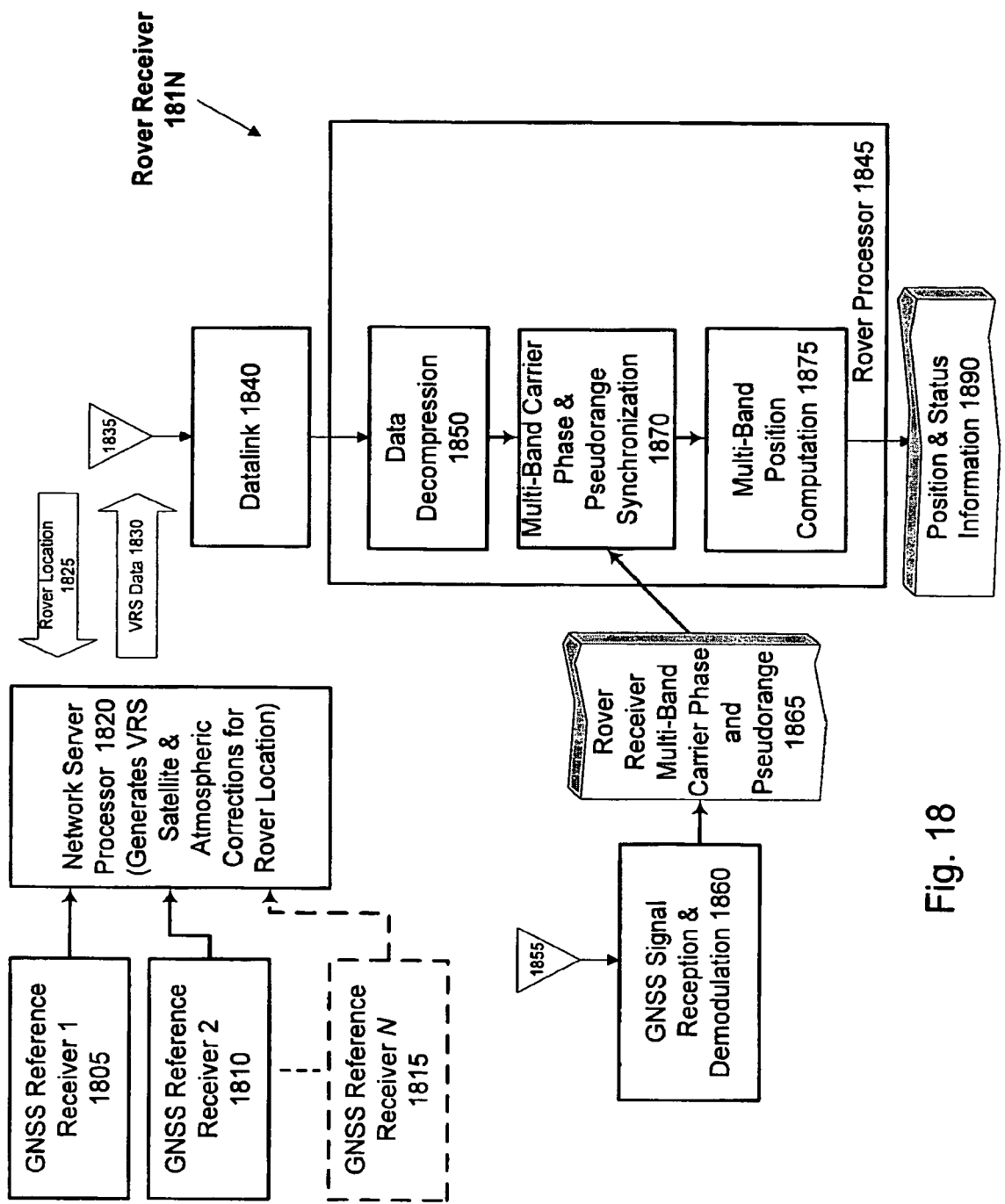
Figure 19:
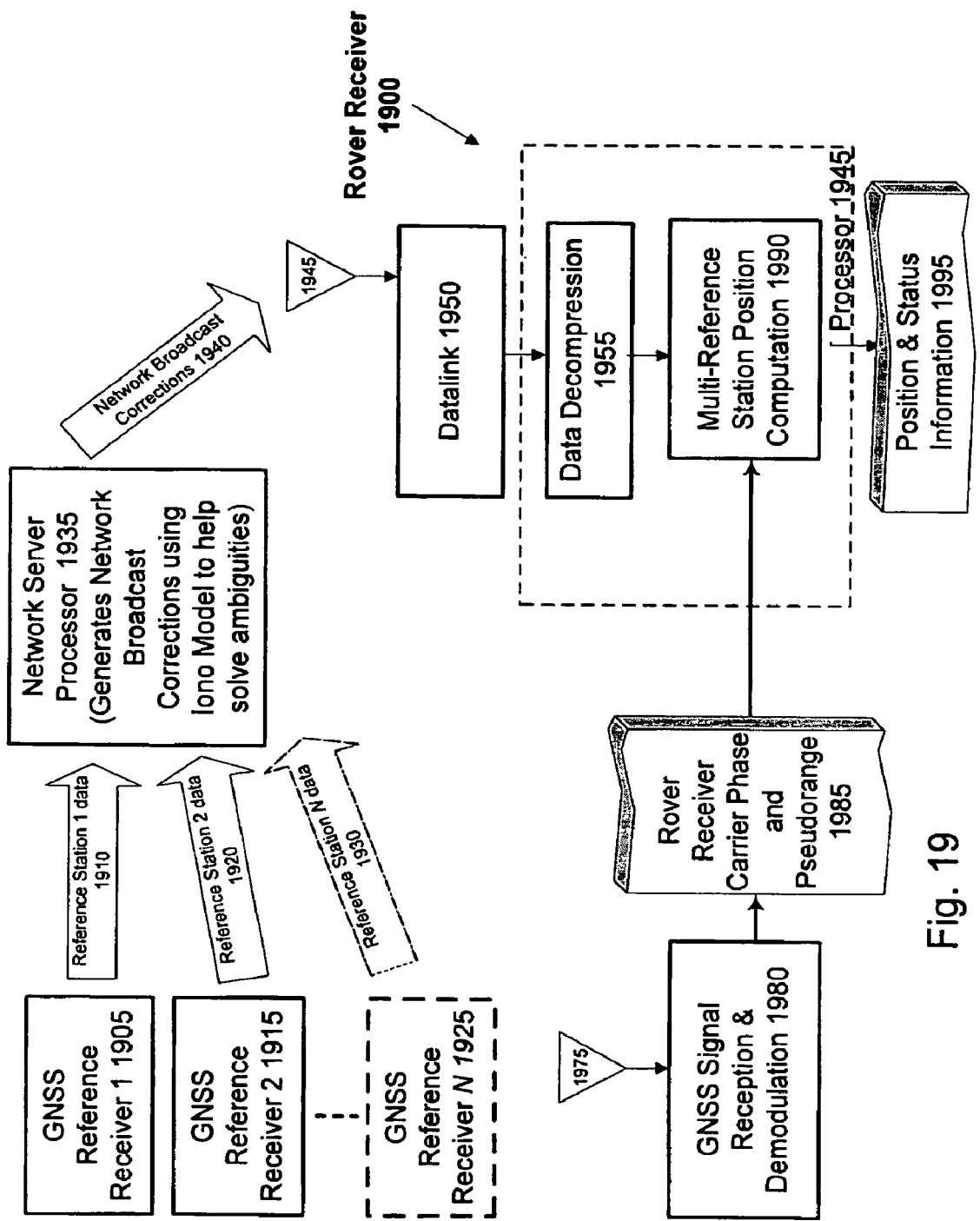

FIG. 12 schematically illustrates a further solution for processing of two-carrier GPS signal data in accordance with an embodiment the invention;

FIG. 13 shows the structure of filters useful in the process of FIG. 12;

FIG. 14 schematically illustrates a typical prior-art scenario with a three-frequency GNSS;

FIG. 15 shows a solution in accordance with the invention suitable for a GNSS system having three or more carrier frequencies;

FIG. 16 illustrates an architecture for computing position using a GNSS system having three or more carrier frequencies in accordance with an embodiment of the invention;

FIG. 17 shows a further solution in accordance with the invention suitable for a GNSS system having three or more carrier frequencies;

FIG. 18 schematically illustrates an application of the invention in a virtual-reference-station positioning environment; and FIG. 19 schematically illustrates an application of the invention in a network broadcast corrections environment.

VI. MODES FOR CARRYING OUT THE INVENTION

Embodiments in accordance with the invention employ a novel and improved approach to GNSS network data processing, in which a federated filter is employed to process the geometric (ionosphere-free) data from reference stations of a network.

Figure 1:
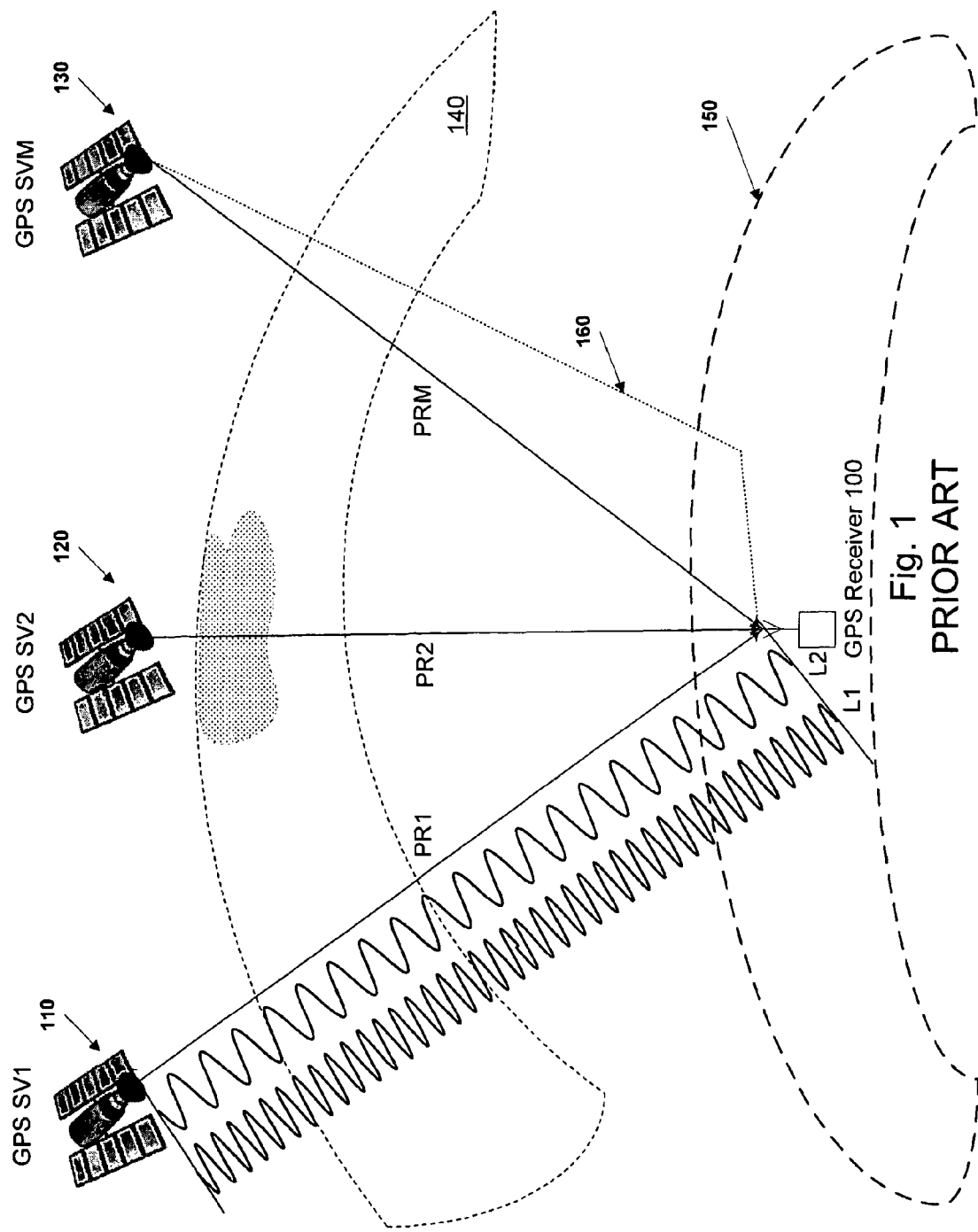
Figure 2:
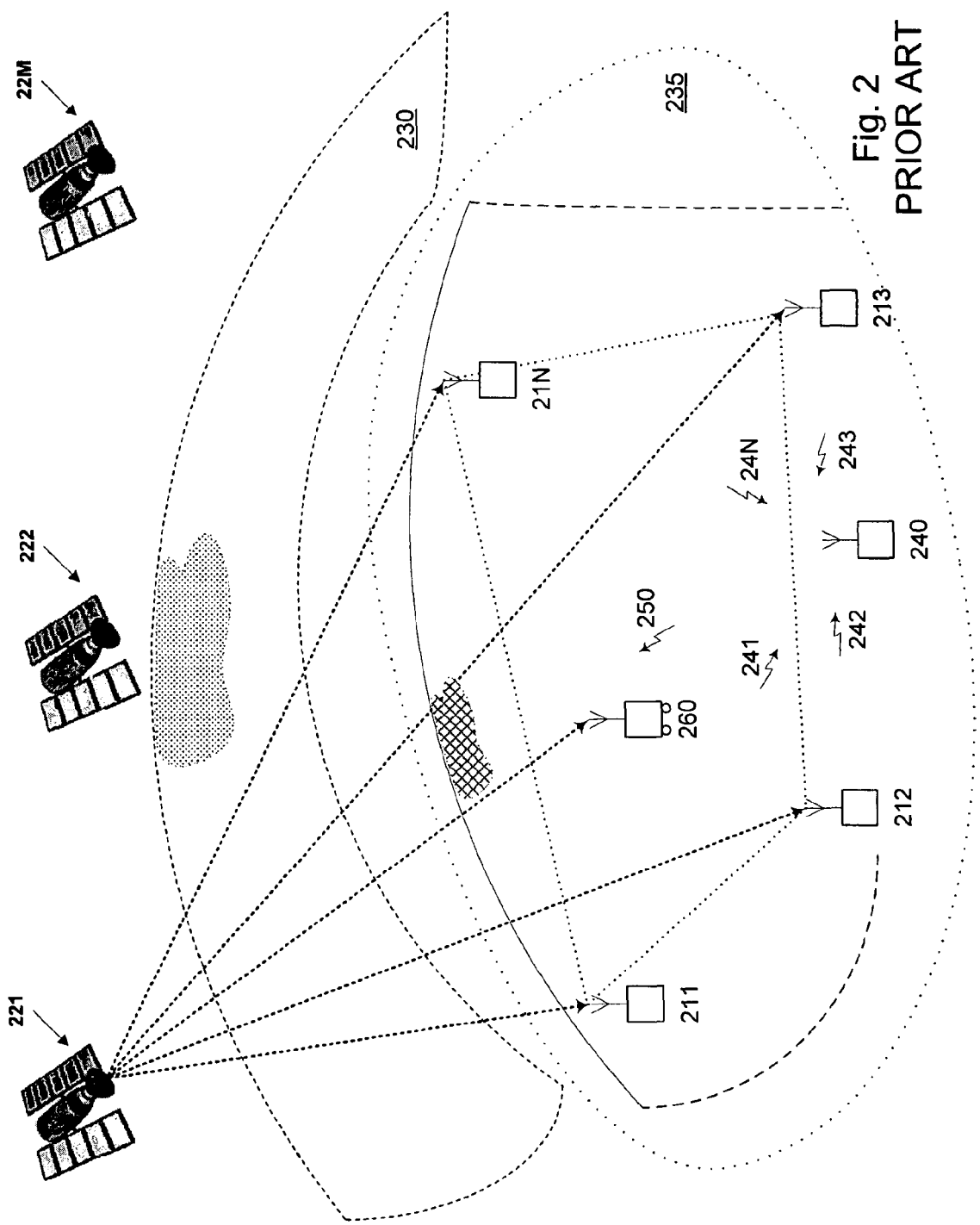
Figure 3:
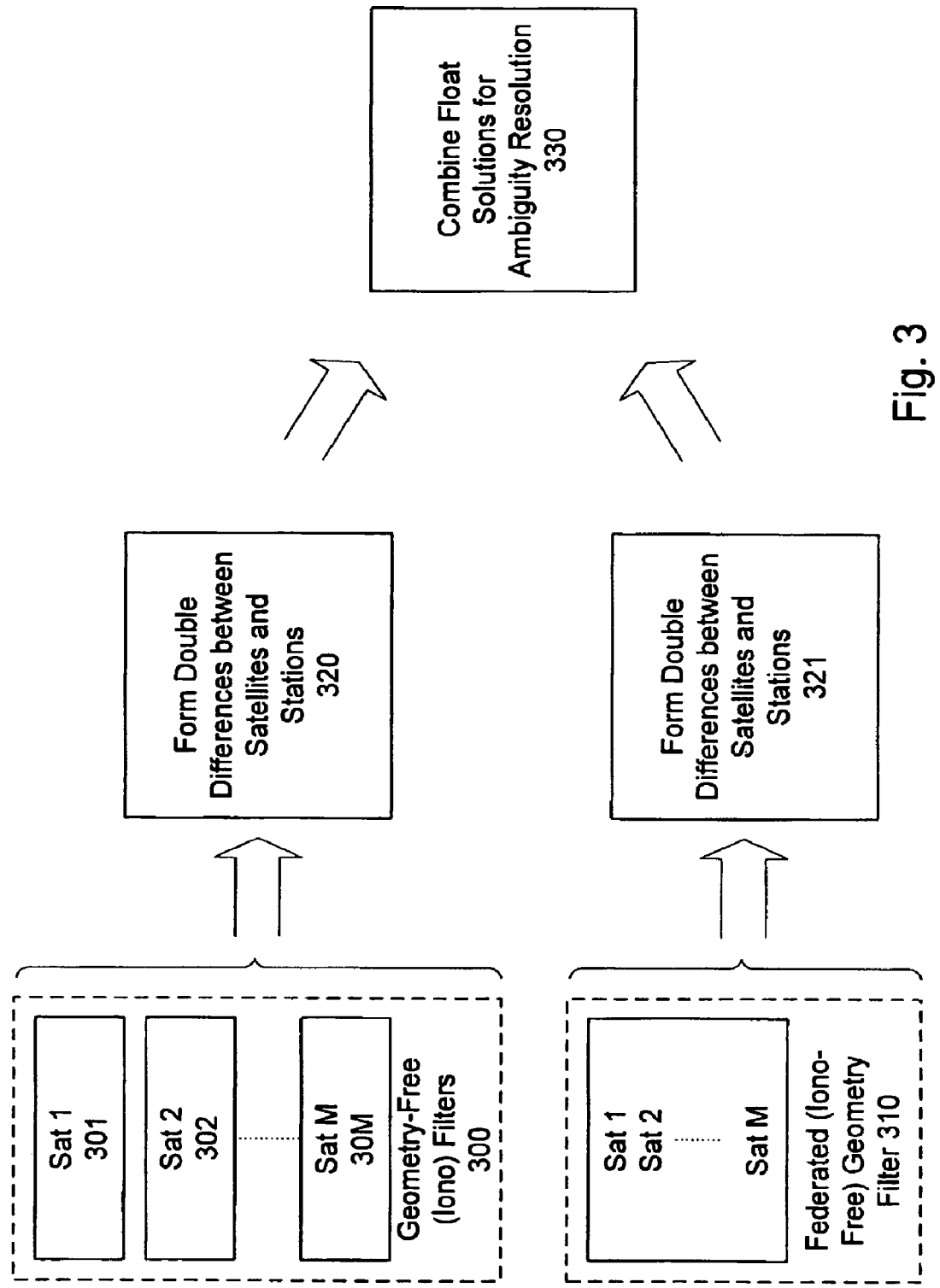

As shown schematically in FIG. 3, a set of geometry-free Kalman filters 300 and a complementary (ionosphere-free) federated geometry filter 310 are employed to completely resolve ambiguities from the carrier-phase measurements taken at N reference stations. A respective one of the geometry-free (ionosphere) filters 301, 302, ..., 30M is provided for each observed satellite 1, 2, ..., M. Processing can be performed with measurements of at least two satellites (M≧2) observed by at least two reference stations (N≧2), for example. In practice it is common to use a network with a larger number of reference stations (e.g., 20 or 30 or more reference stations) tracking 6 to 10 satellites over a period of hours. The state estimates of different filters and reference stations are combined to form double differences of the floating ambiguity estimates in 320. In parallel, an ionosphere-free, federated geometry filter 310 treats all station-satellite pairs to deliver orthogonal estimates for the double differences of the ambiguities in 321. Combining the complementary float solutions of 320 and 321 leads to the final integer ambiguities and their validation at 330.

Embodiments of the invention employ a federated filter approach to processing of geometric-related data, lowering the computation load and enabling real-time processing of data for networks having a large number of reference stations. The basic idea of this federated-filter approach is that:

1. A bank of local Kalman filters has one filter per reference station, with the filters operating in parallel. Each filter operates on measurements from only one reference station. Each single-station filter contains local states representing parameters unique to its reference station, as well as system states representing parameters common to all reference stations.
2. A central fusion master filter receives from each of the local filters a set of local values for the system states and combines these to form a set of common values for the system states. In one embodiment, common values are prepared by computing from the local values an optimal weighted least-squares estimate of the system states and their covariance.
3. The common values from the central fusion processor are used to update the system states of each local filter so that the local filters can compute improved estimates for the local states.

A benefit of this federated filter approach is that each local filter operates with a reduced number of states so that computation time for the federated filter system increases only linearly with the increase in number of reference stations. The computation load is thereby significantly reduced in comparison with the centralized geometry filter approach.

In accordance with some embodiments of the invention, this federated filter approach to GNSS network processing is implemented with each reference station treated as a local sensor having unique states such as receiver clock error and a respective ionosphere-free ambiguity per satellite, and having common states such as satellite clock error and satellite orbit error. The number of common states is thus reduced to four per satellite (one satellite clock error state per satellite and three satellite orbit error states per satellite).

In accordance with further embodiments of the invention, the computation load is further reduced by estimating the satellite orbit error states with an additional filter (called a "frame filter") using measurements from a subset of the reference stations, and applying these estimated orbit errors directly to the observation. The reference stations of this subset are substantially fewer in number than the entire network so as to obtain faster processing, for example, those well-distributed about the periphery of the network. In accordance with further embodiments of the invention, the frame filter provides an a-priori tropo-scaling factor to stabilize the single-station geometry filters in the first several epochs of operation.

Using a frame filter significantly reduces the number of states in the local filter and makes the computation for a network having a large number of reference station even faster. For example, with a network of 123 reference stations and using the centralized geometric-filter approach in an Intel 3.06 GHz processor, the network processing including ionospheric modeling and network ambiguity fixing requires approximately 88 hours to process 24 hours of network data, making it impossible to run the network in real time with such a processor. With the federated filter approach, only 7 hours is needed, 12 times faster than the centralized approach, enabling real time operation of the network with such a processor while maintaining the availability and reliability of network processing.

The measurements are acquired by a network of N reference stations, each with precisely known coordinates (xn, yn, zn),n∈{1, ..., N}. The stations receive code and phase measurements from M satellites at coordinates (x$^m$(t), y$^m$(t), z$^m$(t)), m∈{1, ..., M(t)}. The geometry of the space segment (positions of orbiting satellites as viewed from each reference station) varies continuously, and the number of satellites M visible at each reference station changes with time t. Physical separation of the reference stations is on the order of 10-100 km. Signals received from multiple satellites at a given reference station probe substantially the same region of the troposphere. A strong correlation between the tropospheric effects from satellite to satellite at a given station is therefore assumed, while the tropospheric effects from station to station are considered largely independent.

Figure 4:
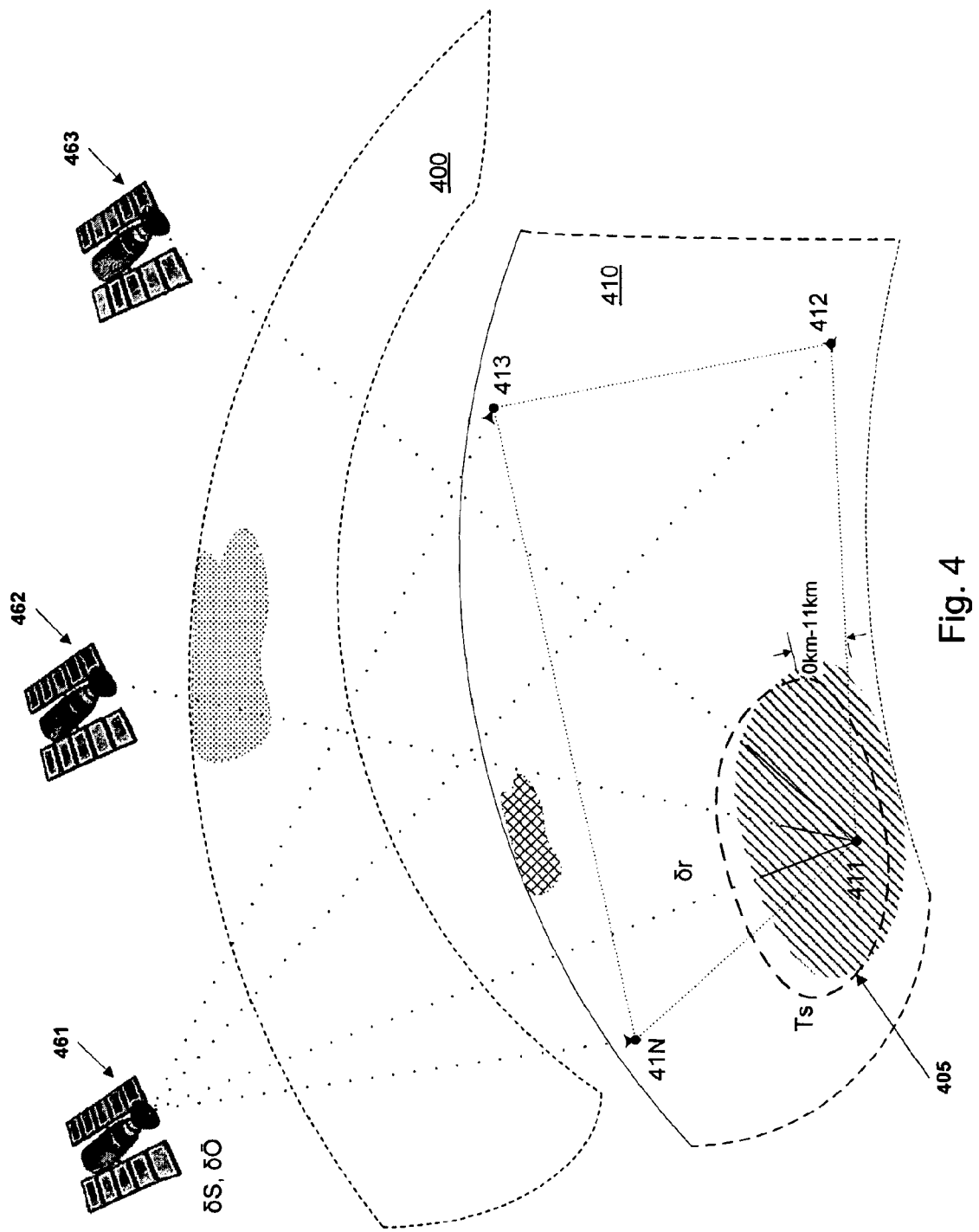

FIG. 4 schematically illustrates an ionospheric shell 400 and a portion 405 of a tropospheric shell surrounding the earth, with a ground-based reference stations 411, 412, 413, ... 41N of a network each receiving signals from GNSS satellites 461, 462, ... 46M. For convenience of illustration, only the portion 405 of the tropospheric shell surrounding reference station 411 is shown. The troposphere has a depth of, for example zero to about 11 km. Errors common to all reference stations include satellite-clock error BS of each satellite and satellite-orbit error vector δÖ of each satellite.

Errors unique to each reference station include reference-station clock error δr and tropospheric-delay Ts. Tropospheric delay affects the signals received by each reference station in a manner depending on atmospheric temperature, pressure and humidity in the vicinity of the reference station, as well as the elevation of the satellite relative to the reference station. The error is about 1 mm per meter at ground level, such that the last meter of the signal path to the reference station gives about 1 mm of error in the tropospheric model.

Various techniques are known for modeling tropospheric path delay on the signals. See, for example, B. HOFMANN-WELLENHOF et al. GLOBAL POSITIONING SYSTEM: THEORY AND PRACTICE, 2d Ed., 1993, section 6.3.3, pp. 98-106. Tropospheric scaling (tropo-scaling) which lumps the atmospheric parameters into one tropo-scaling parameter can be implemented in at least three ways. A first approach is to model Zenith Total Delay (ZTD) representing tropospheric delay in a vertical direction relative to the reference station as a value representing range error δr, e.g., 2.58 meters. A second approach is to model the sum of one plus a scaling factor (1+S) such that tropospheric delay in the vertical direction T'=(1+S) T, where T is a constant, e.g., 1+S=1.0238. A more convenient approach is to model S directly, e.g., S=2.38%. For purposes of the present invention, it is sufficient to treat as "tropospheric effect" all that affects different signal frequencies in the same way (non-dispersive).

Figure 5:
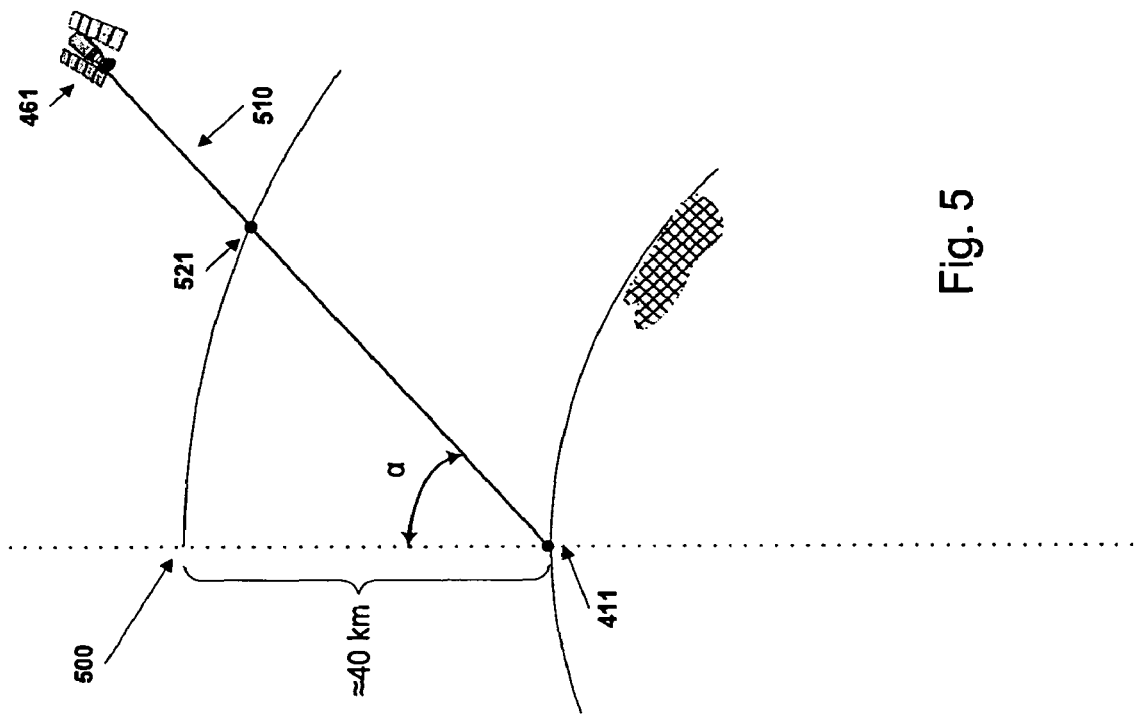

FIG. 5 illustrates a slanted ray path from a satellite to a receiver passing through the troposphere. Except when a satellite is directly over a reference station, signal rays penetrate the atmosphere in a slant path from satellite to receiver as shown in FIG. 5, which may be viewed as a signal ray 510 from satellite 461 to reference station 411. Since the slant path of the signal ray from a given satellite to each reference station penetrates the troposphere at a different angle, the angle is different for each satellite. Thus, the tropospheric mapping function is different for each satellite-to-reference-station combination. The effect of the different slant angles can be compensated by relating the geometry-dependent zenith delay Tα with a geometry-independent $T_{90}°$ (Vertical T) by a mapping function m(α): Tα=m(α) $T_{90}°$ The inventive concepts described above can be employed in a wide variety of processes and equipment. Some exemplary embodiments will now be described. It will be understood that these are intended to illustrate rather than to limit the scope of the invention.

Figure 6:
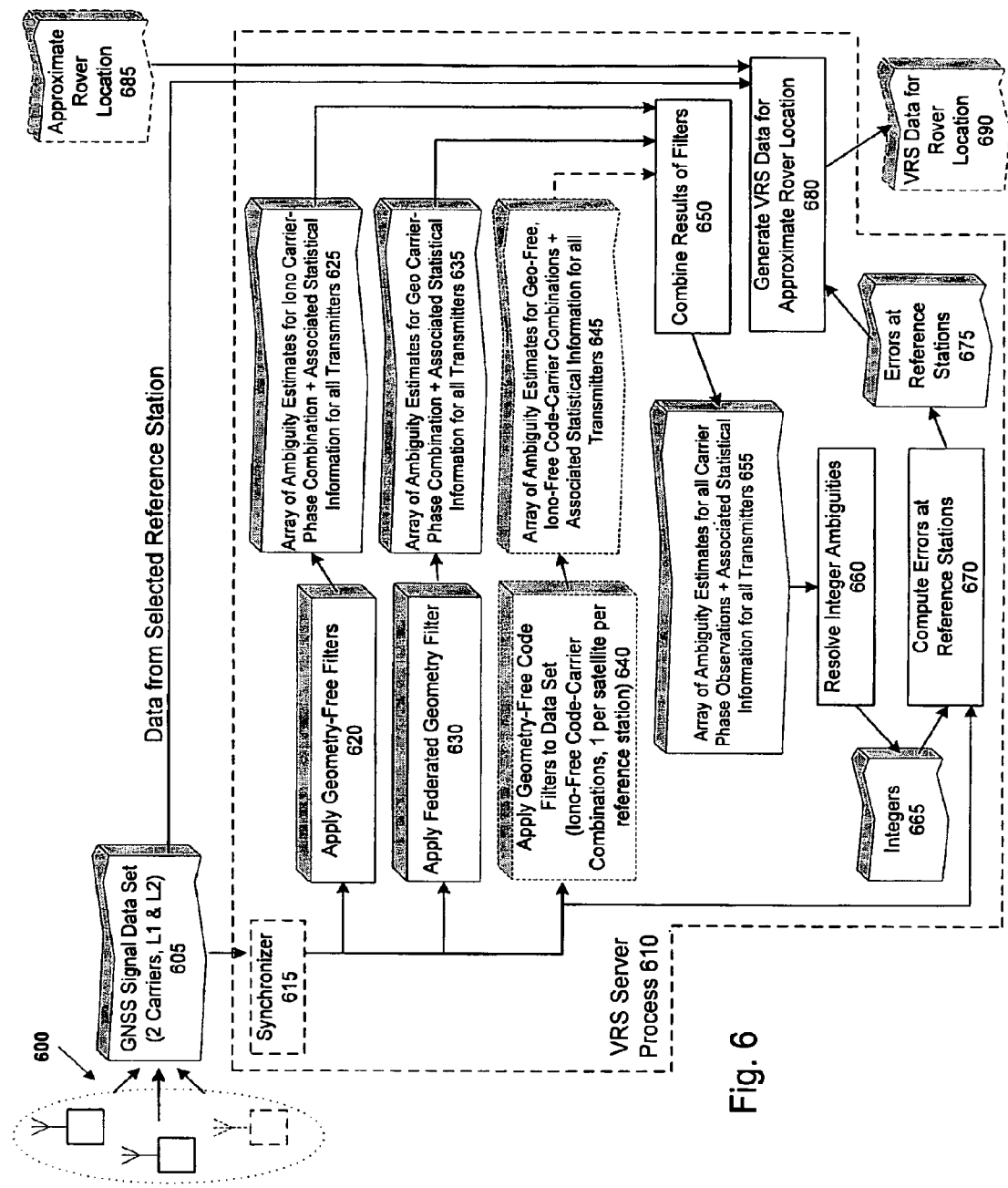

FIG. 6 schematically illustrates a solution for processing of two-carrier GNSS signal data in accordance with the invention. Network receivers 600 supply a set of GNSS signal data 605 having observations of L1 and L2 for multiple satellites. GNSS signal data sets 605 are processed in a VRS (Virtual Reference Station) Server Process 610. After passing the signal data through a synchronizer at 615 they are supplied to separate filter processes: a geometry-free filter process 620, an ionosphere-free filter process 630, and an optional geometry-free and ionosphere-free code filter process 640. Ionosphere-free filter process 630 employs a federated geometry filter to obtain an array 635 of ambiguity estimates for the geometry carrier-phase combination and associated statistical information. Code filter process 640 uses geometry-free and ionosphere-free code-carrier combinations to obtain an array 645 of ambiguity estimates for the geometry-free and ionosphere-free code-carrier combinations and associated statistical information. Arrays 625, 635 and 645 are supplied to a combining process 650 to obtain an array 655 of ambiguity estimates for all carrier-phase observations and associated statistical information. Array 655 is supplied to a computation process 660 to compute the integer values of the ambiguities. With the resulting integers of 665 and the original GNSS data from the synchronizer, the errors at the reference stations are calculated at 670. Using these errors 675, VRS data at the approximate location of the rover is calculated at 680 by shifting data from a reference station close to the rover location. Preferentially one chooses the data from the station closest to the rover. This data stream is supplied to the rover at 690.

Figure 7:
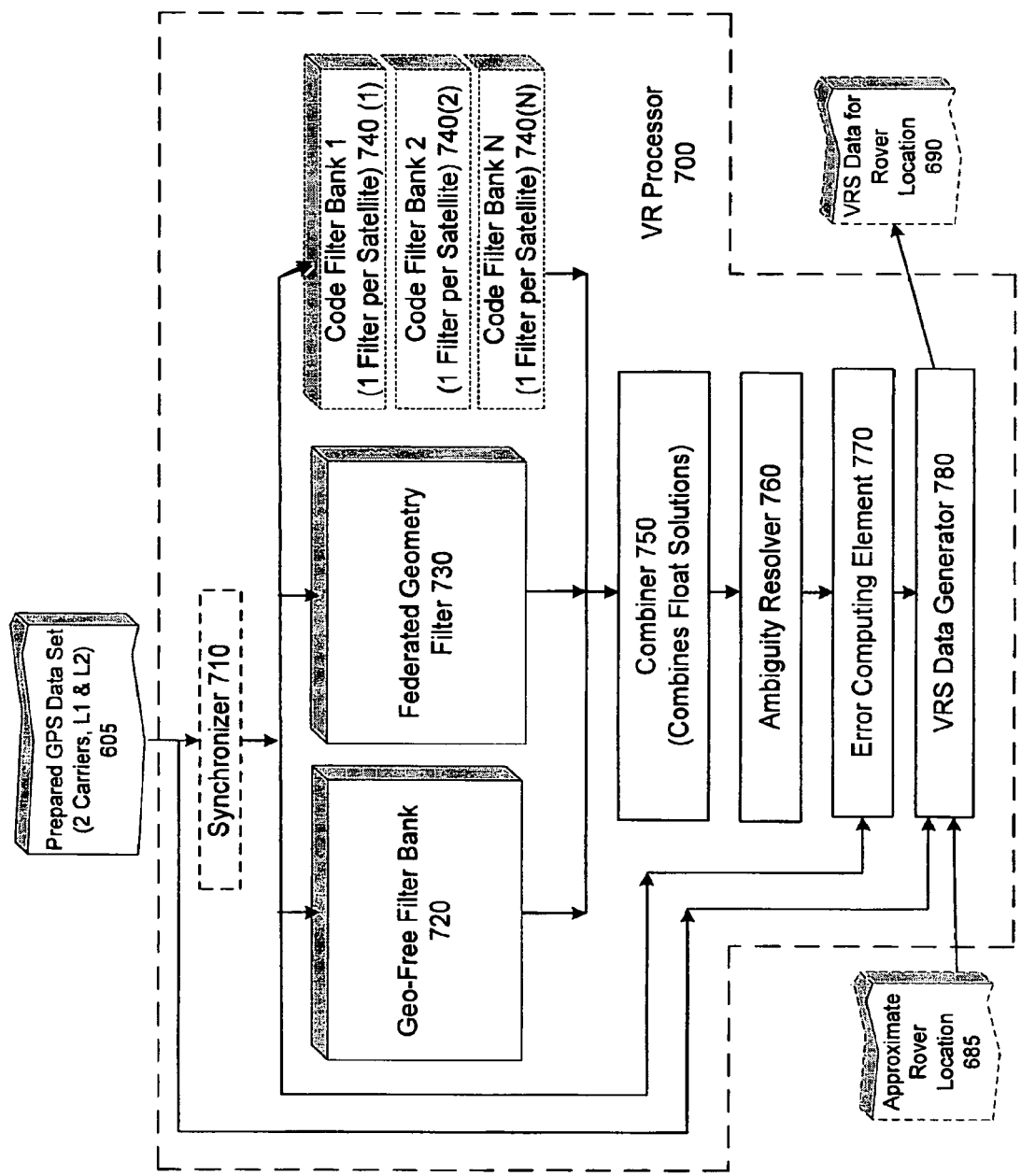
FIG. 7 shows the structure of filters useful in the process of FIG. 6.

FIG. 7 shows the structure of filters useful in the process of FIG. 6. GPS signal data sets are supplied to a VRS processor. After synchronization in synchronizer 710, they are streamed to a bank of geometry-free filters 720. GPS signal data set 605 is also supplied to a federated geometry filter 730 which processes the observations of all M observed satellites. GPS signal data set is optionally supplied to code filter bank 740 having one bank per station, where each bank holds one filter per satellite. Each filter of bank 740 processes the observations taken at multiple reference stations for a single satellite; one filter is provided for each of M observed satellites. A combiner 750 bundles the float solution of the different filters, followed by an integer ambiguity resolution in ambiguity resolver 760. The ambiguities are applied to the measurements of the reference stations to calculate the errors at the reference stations in error-computing element 770. Given the approximate location of the rover 685, a VRS data stream is calculated in a VRS data generator 780 which provides a stream of VRS data 690 to the rover.

Figure 8:
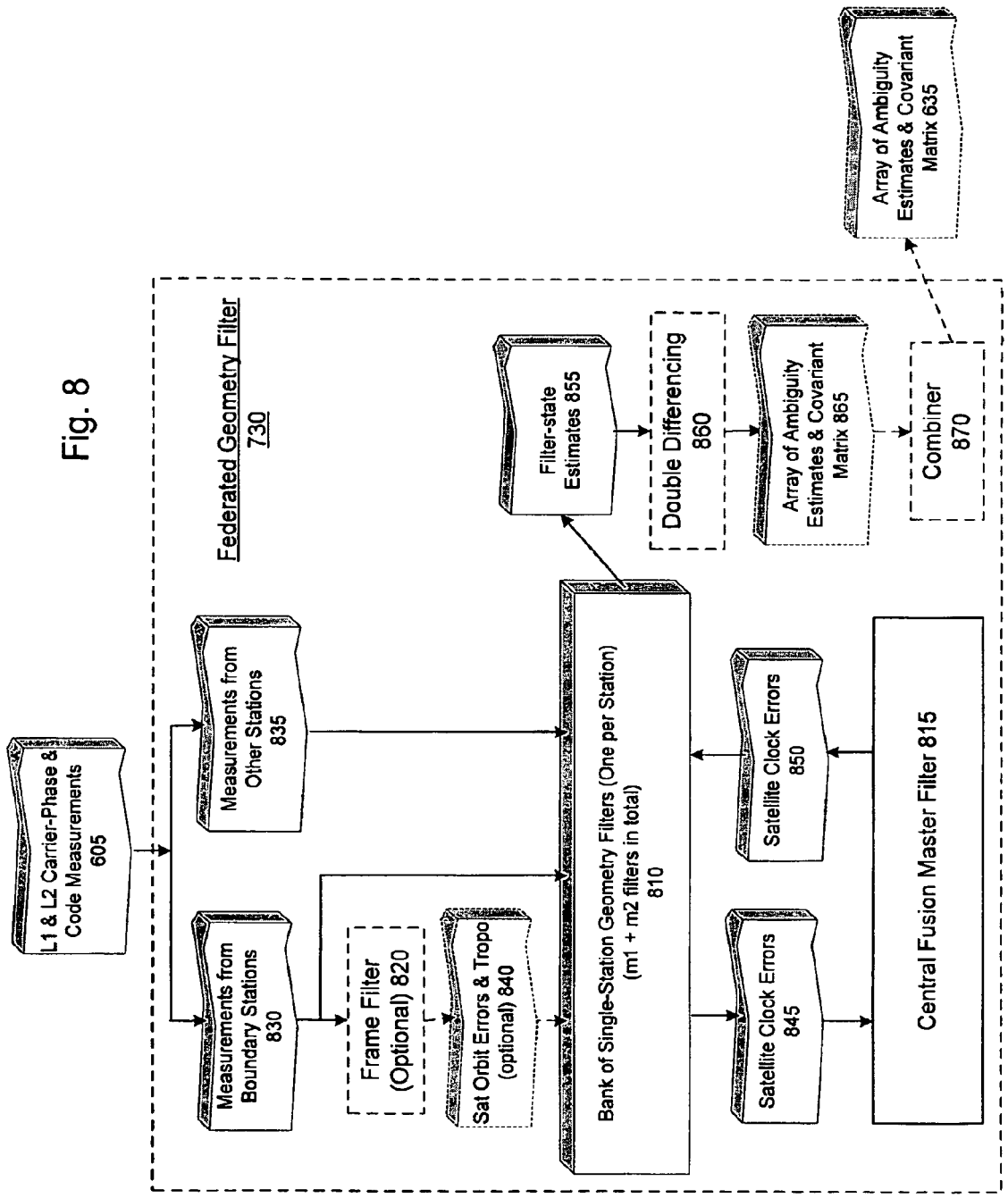
FIG. 8 shows the structure of the federated geometry-free filter of FIG. 7.

FIG. 8 shows the structure of a federated geometry filter 730 useful in the process of FIG. 7. Federated geometry filter 730 has a bank of single-station geometry filters 810 (one filter per reference station), a central fusion master filter 815, and an optional frame filter 820. If the optional frame filter 820 is provided, synchronized GPS signal data sets 605 from the network's reference stations are divided into two groups: the data 830 from a subset of reference stations, such as reference stations distributed about the periphery of the reference-station network, are supplied to the frame filter 830 and to the single-station filters, while the data 835 from the remaining reference stations of the network are supplied to the single-station geometry filters 810. If optional frame filter 820 is not provided, then the synchronized GPS signal data sets 825 from all reference stations are supplied to the single-station geometry filters 810.

If the optional frame filter 820 is provided, it supplies the single-station geometry filters 810 with an array 840 comprising satellite-orbit error values, as these are common to all reference stations and are thus more efficiently prepared in the frame filter. Array 840 may optionally further include tropo-scaling values for the single-station filters during the initial epochs of operation (e.g., during the first ten or several tens of epochs) for faster convergence of the single-station filters. If the frame filter is not provided, then precise satellite-orbit errors from an alternate source may be supplied to the single-station filters. The alternate source can be, for example, "Ultra-Rapid" predicted orbit-error data available from a data service provider such as the International GNSS Service (IGS) or others. The IGS provides orbit estimates with errors of less than 30 cm for the next 24 hours based on orbit data of the past 24 hours; see, e.g., http://igscb.jpl.nasa.gov/components/prods.html. Ephemeris data broadcast from the satellites has a typical error on the order of 2.5 m. In the absence of a frame filter or an alternate source of satellite-orbit error corrections, the single-station filters are preferably initialized assuming a zero satellite-orbit error. Use of the frame filter is preferred as it stabilizes the single-station filters and speeds their convergence by moving the satellite-orbit error states to the frame filter.

If the frame filter is not provided, or if it is not used to provide tropo-scaling for early epochs of operation of the single-station filters, then tropo-scaling values may be obtained from an alternate source, for example, tropo map data based on latitude/longitude of the reference station and time of year, or based on atmospheric measurements of temperature, pressure and/or humidity at the reference station. Though use of a priori tropospheric data is not required, a good estimate is useful to stabilize and speed convergence of the single-station filters.

Each single-station filter prepares its own estimate of satellite clock errors. As these states are common to all reference stations, the estimates 845 from the single-station filters are supplied to a central fusion master which computes an optimal estimate of these states and feeds the optimal estimated values 850 back to the single-station filters as updates to be used for improving the other state estimates of the single-station filters. The final estimates for the single-filter states 855 are supplied to a double-differencing processor 860 which produces an array of ambiguity estimates with covariant matrix 865. These are supplied to a combiner 870 which supplies an array of ambiguity estimates with covariant matrix 635.

Figure 9:
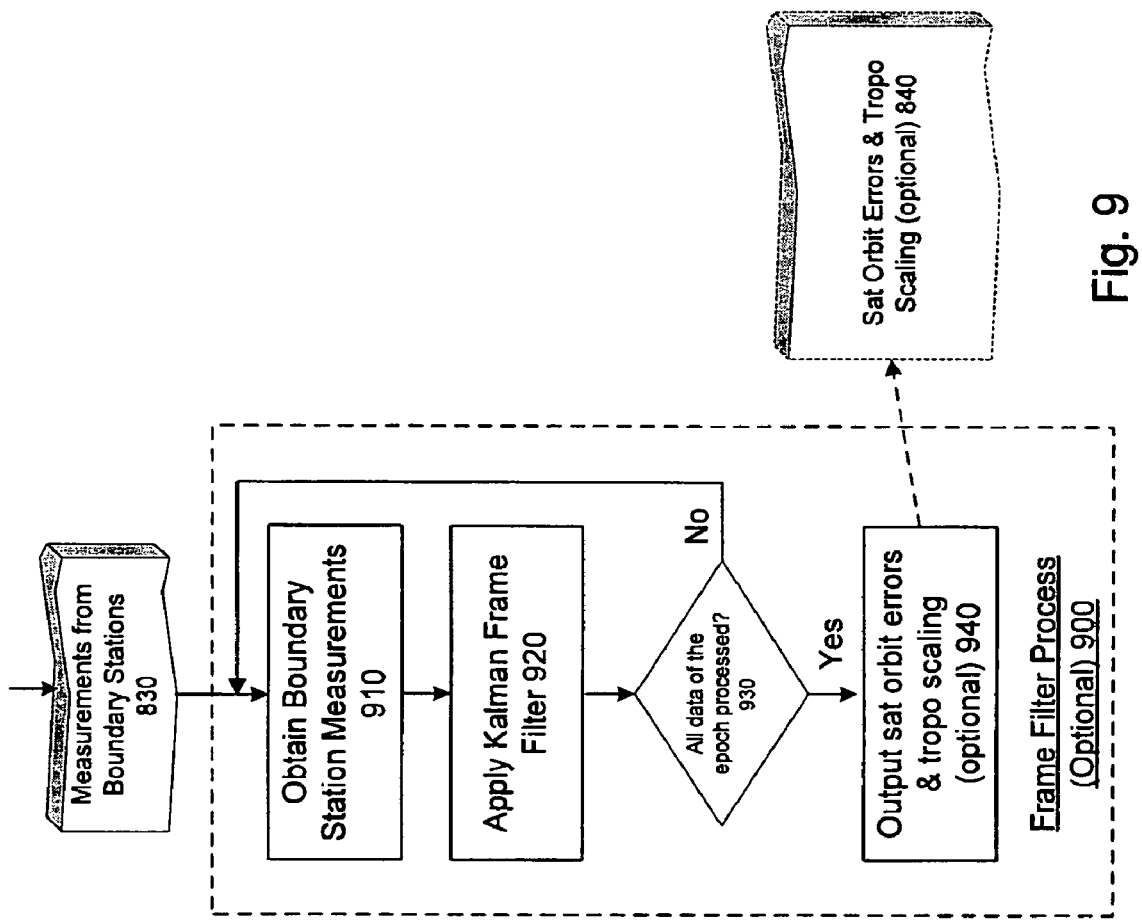
FIG. 9 is a flow chart showing operation of the optional frame filter of FIG. 8.

FIG. 9 is a flow chart showing operation of the optional frame filter 820. Signal measurements 830 from the boundary reference stations (or other subset of reference stations) are obtained at 910. A Kalman frame filter 920 is applied to measurements 830 at 920. A check is made at 930 whether all data of the epoch have been processed. If no, additional data for the epoch is obtained to update Kalman frame filter 920. When all data of the epoch have been processed, satellite-orbit error estimates (and optionally tropo-scaling estimates) 840 are output at 940.

The frame filter runs with the ionospheric-free code and carrier phase data of all satellites from the stations on the network boundary ($m_1$ stations). The frame filter has at least two uses: (1) to provide satellite orbit error for the single-station geometry filters, and (2) optionally to provide average troposcaling for the single-station geometry filters. The average troposcaling estimated from the frame filter is fed into the single-station geometry filters in the initial epochs of operation to stabilize the single-station filters. Orbit error estimates are used to correct reference-station observations which are input into the single station filters.

The state vector for the frame filter is:

$$X^F = [\vec{Ts}, \vec{\delta r}, \vec{N}, \vec{\delta s}, \vec{do}]^T \quad (1)$$

Where, $$\vec{Ts} = [Ts_1, Ts_2, \ldots Ts_{m1}] \quad (2)$$

is the troposcaling vector which contains troposcaling states for $m_1$ boundary reference stations, one per station.

$$\vec{\delta r} = [\delta r_1, \delta r_2, \ldots \delta r_{m1}] \quad (3)$$

is the receiver clock error vector which contains the receiver clock error for $m_1$ boundary stations, one per station.

$$\vec{N} = [N_1^1, N_1^2 \ldots N_1^n, N_2^1, N_2^2, \ldots N_2^n, \ldots N_{m1}^1, N_{m1}^2 \ldots N_{m1}^n] \quad (4)$$

is the ambiguity vector which contains ambiguities for all n satellites at all $m_1$ boundary stations, one per satellite per station.

$$\vec{\delta s} = [\delta s^1, \delta s^2, \ldots \delta s^n] \quad (5)$$

is the satellite clock error vector which contains n satellite clock errors.

$$\vec{do} = [dl^1, dx^1, dr^1, dl^2, dx^2, dr^2, \ldots dl^n, dx^n, dr^n] \quad (6)$$

is the orbit error vector for n satellites having three parameters (along-track error dl, cross-track error dx, and radial error dr) per satellite.

A standard Kalman filter can be applied for the frame filter. The system model of Kalman filter is:

$$X_{k+1}^F = \Phi X_k^F + w_k$$

$$Y_k = H_k X_k^F + v_k \quad (7)$$

Where $\Phi$ is the state transition matrix; $H_k$ is the observation (design) matrix; $Y_k$ is the observation vector which contains ionospheric-free code and carrier phase measurements; the process noise and measurement noise, $\{w_k\}$ and $\{v_k\}$, are uncorrelated zero-mean white-noise with known covariance $Q_k$ and $R_k$. Troposcaling is assumed to be a random walk process, receiver clock and satellite clock error are assumed to be a white noise process that will be reset after each estimation cycle (the estimates will be reset to 0 and the variance will be set to a large number $1e^{90}$), ambiguity is assumed to be constant, and satellite orbit error is assumed to be first order Gauss-Markov process.

The state transition matrix of the frame filter is:

$$\Phi = \begin{bmatrix} I_{m1 \times m1} & & & & \\ & I_{m1 \times m1} & & & \\ & & I_{(m1 \times n) \times (m1 \times n)} & & \\ & & & I_{n \times n} & \\ & & & & e^{-\Delta t/t_c} I_{(n \times 3) \times (n \times 3)} \end{bmatrix} \quad (8)$$

The covariance for system process noise is:

$$Q_k = \begin{bmatrix} \Delta t \cdot q_{tr}^2 I_{m1 \times m1} & & & & \\ & 0_{m1 \times m1} & & & \\ & & 0_{(m1 \times n) \times (m1 \times n)} & & \\ & & & 0_{n \times n} & \\ & & & & q_{orb}^2 (1 - e^{-2\Delta t/t_c}) I_{(n \times 3) \times (n \times 3)} \end{bmatrix} \quad (9)$$

Where $\Delta t$ is time difference between epochs, $q_{tr}$ is the noise input for troposcaling, 0.2% per square hour, and $q_{orb}$ is assumed to be 10 meter and $t_c$ is the time constant for orbit error which is assumed to be 12 hours.

Observables for the frame filter are (1) ionospheric-free code $P_i^j$ minus ionospheric-free carrier phase $\phi_i^j$ (in units of meters) and (2) ionospheric-free carrier phase $\phi_i^j$, where subscript i is the station index and superscript j is the satellite index. All the observations (code-carrier and carrier phase) are considered to be uncorrelated. Although code-carrier phase is in fact correlated with carrier phase observations, the correlation can be safely ignored due to the noise on code being 2~3 orders of magnitude larger than the carrier phase noise. The frame-filter observation equations are:

$$P_i^j - \phi_i^j = N_i^j + \epsilon p_i^j \tag{10}$$

$$\phi_i^j = \rho_i^j + T_i^j + \begin{bmatrix} T_i^j & 1 & 1 & -1 & \frac{\partial \phi_i^j}{\partial dl^j} & \frac{\partial \phi_i^j}{\partial dx^j} & \frac{\partial \phi_i^j}{\partial dr^j} \end{bmatrix} \begin{bmatrix} Ts_i \\ \delta r_i \\ N_i^j \\ \delta s^j \\ dl^j \\ dx^j \\ dr^j \end{bmatrix} + \epsilon \phi_i^j \tag{11}$$

Where $P_i^j, \Phi_i^j$ are the ionospheric-free code and carrier phase observation for satellite j at station i;

$\rho_i^j$ is the geometric distance between satellite j and the reference station i;

$T_i^j$ is the tropospheric delay correction calculated from a standard tropospheric model, for example, the Niell model.

$$\frac{\partial \phi}{\partial dl}, \frac{\partial \phi}{\partial dx}, \frac{\partial \phi}{\partial dr}$$

are the partials to along-track, cross-track and radial satellite-orbit error.

If n satellites are observed at all m1 stations, we will have the observation vector:

$$Y^k = \{P_1^1 - \phi_1^1, \ldots P_{m1}^n - \phi_{m1}^n, \phi_1^1 - \rho_1^1 - T_1^1, \ldots \phi_{m1}^n - \rho_{m1}^n - T_{m1}^n\}^T \tag{12}$$

The observation matrix $H_k$ is readily derived from equations (10) and (11) if desired. $H_k$ is the Jacobian matrix of partial derivatives of $Y^k$ with respect to X where X is the state vector.

In one preferred embodiment, a factorized UD form of Kalman filter is used because it is numerically more stable than the standard Kalman filter. With the UD form of Kalman filter, the observations are put into the filter one by one if they are uncorrelated, so there is no need to form the observation matrix $H_k$ explicitly, saving memory and avoiding a large matrix operation which would be required in the case of a network having a large number of reference stations. Kalman filters, federated Kalman filters, and the factorized UD form of Kalman filters are described in G. MINKLER et al., THEORY AND APPLICATION OF KALMAN FILTERING, Magellan Book Company, 1993, pp. 473-505 and 567-585. Federated Kalman filters are also described in N. CARLSON, *Federated Square Root Filter for Decentralized Parallel Processes*, IEEE TRANSACTIONS ON AEROSPACE AND ELECTRONIC SYSTEMS, Vol. 26, No. 3, May 1990, p. 517-525.

Satellite orbit errors are estimated in the frame filter. The average troposcaling is taken, for example, as the mean value of the estimated troposcaling from all the boundary stations, or using any other desired method, such as collation, value of plane through the station, etc. Each single station geometry filter uses ionospheric-free code and carrier phase observations from a respective reference station.

Figure 10:
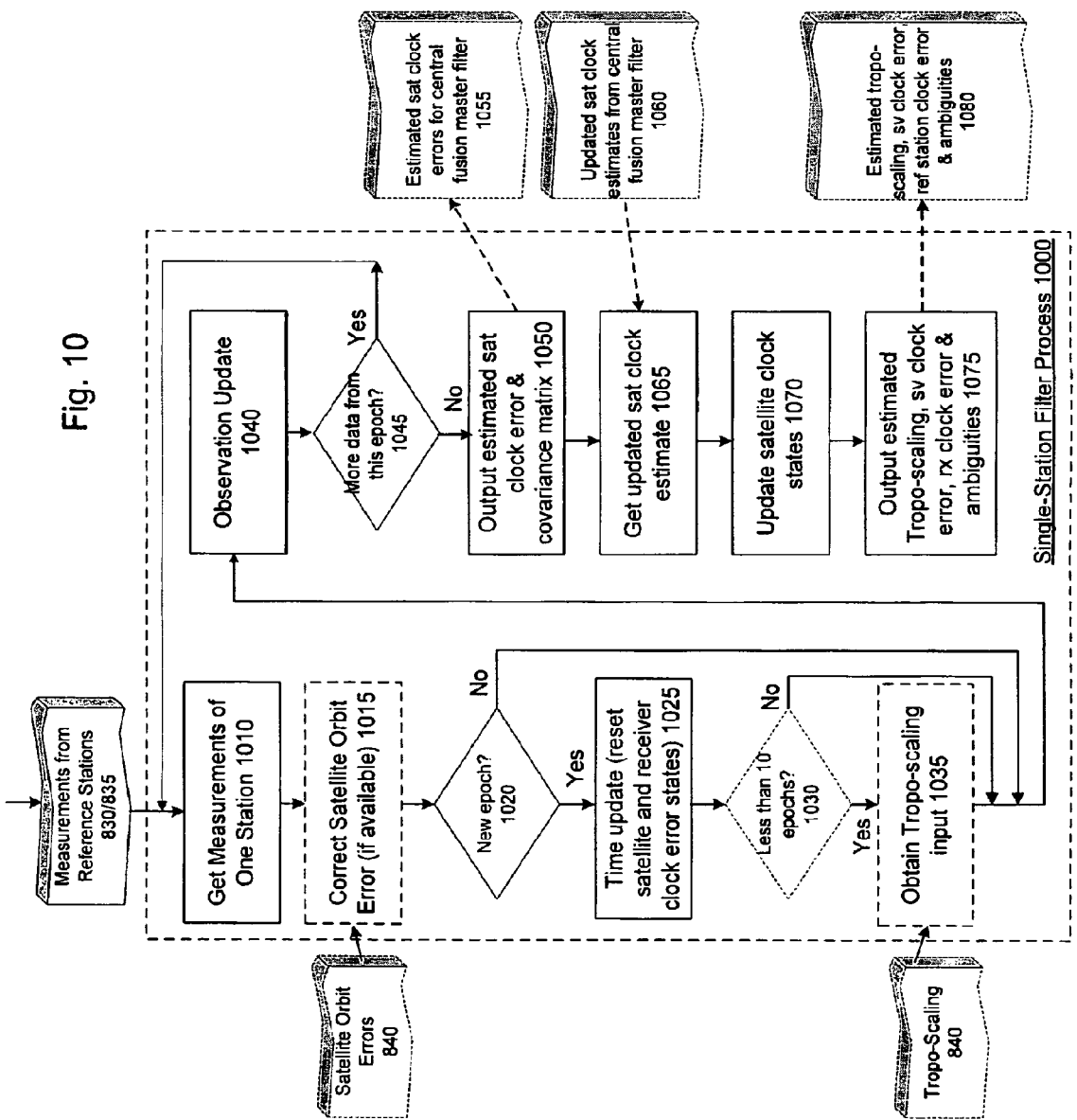
FIG. 10 is a flow chart showing operation of a single-station filter of FIG. 8.

FIG. 10 is a flow chart of the single-station geometry filter process 1000. Reference-station measurements 830/835 for a station are obtained at 1010. Satellite-orbit error corrections, if available, are applied at 1015 to correct the satellite-error states of the single-station filter. A check is made at 1020 whether the data is for a new epoch. If yes, the time is updated at 1025 by resetting satellite clock-error and reference-station clock-error states. If no, then observation data are updated at 1040. A check is made at 1030 whether less than ten epochs (or some other number of epochs, if desired) of data have been processed. If yes, then tropo-scaling input data are obtained at 1035 before updating observation data at 1040. If no (or if no tropo-scaling data is provided), then observation data are updated at 1040. A check is made at 1045 whether more data is available for the current epoch. If yes, then control passes back to 1010 to obtain data for another reference station. If no, then satellite clock errors are estimated at 1050 and supplied with a covariance matrix as an input data set 1055 for the central fission master filter 815. At 1065 a set of global satellite clock estimates 1060 for updating at 1070 the satellite clock states of the single-station filter are obtained from central fusion master filter 815. Using the updated satellite clock states, the single-station Kalman filter states are updated at 1075 and an array of single-station estimates 1080 is output comprising values for tropo-scaling, satellite clock error, reference-station clock error and ambiguities.

For each station i, the states in the single station geometry filter are:

$$X_i = \begin{bmatrix} \underbrace{Ts_i, \delta r_i, N_i^1, N_i^2, \ldots N_i^n}_{\text{Local unique states } X_{i,u}} & \underbrace{\delta s^1, \delta s^2, \ldots \delta s^n}_{\text{Common States } X_{i,c}} \end{bmatrix}^T \tag{13}$$

$$= [X_{i,u}, X_{i,c}]^T$$

Where:

Ts is the tropo-scaling factor, $\delta r_i$ is the receiver clock error of the station, and $N_i^1, N_i^2, \ldots N_i^n$ are iono-free ambiguities for n satellites. These states are unique for one reference station, identified in Equation (13) as local unique states $X_{i,u}$. $\delta s^1, \delta s^2, \ldots \delta s^n$ are satellite clock errors for n satellites. These states are common for all the single-station geometry filters, identified in Equation (13) as common states $X_{i,c}$.

The state transition matrix of the single-station geometry filters is:

$$\Phi_i = \begin{bmatrix} 1 & & & \\ & 1 & & \\ & & I_{n \times n} & \\ & & & I_{n \times n} \end{bmatrix} \tag{14}$$

$$Q_i = \begin{bmatrix} \Delta t \cdot q_{tr}^2 & & & \\ & 0 & & \\ & & 0_{n \times n} & \\ & & & 0_{n \times n} \end{bmatrix} \tag{15}$$

Where $Q_i$ is the covariance for system process noise, $\Delta t$ is time difference between epochs.

$q_{tr}$ is the noise input for tropo-scaling, 0.2% per square hour.

In the single station geometry filter, tropo-scaling can be a random walk process or first-order or second-order Gauss- Markov process. Receiver and satellite clock errors can be treated as white noise process and can be reset every epoch; if the reference station has a good clock it can instead be treated as a linear drift. Ambiguity states are treated as constants.

As the diagonal elements in the state transition matrix are all 1 (I indicates an identity matrix, with the subscripts indicating the dimensions of the matrix) and the system noise input matrix has only one diagonal entry for the tropo-scaling (other entries are all 0), the time update step is straightforward: the predicted state estimates $\delta s^j$ remain the same as the last epoch, the variance of the troposcaling noise input term adds into the predicted error covariance matrix, and the receiver states are set to 0 with variance of 1 ms$^2$; the satellite clock error states are totally reset and the satellite clock errors read from ephemeris are used as pseudo-observations $dt^j$, and variance of the satellite clock error states is set to a predefined value *m, where m is number of reference stations in the network.

$$dt^j = \delta s^j + \epsilon_{sc} \quad (16)$$

If the filter runs less than 10 epochs (optionally, up to some tens of epochs), average tropo-scaling is input as a pseudo-observable to stabilize the filter and make the convergence faster.

$$Ts_{average} = Ts_i + \epsilon_{ts} \quad (17)$$

In each epoch, the ionospheric-free carrier phase observation is corrected for satellite orbit error before being put into the single-station Kalman filter:

$$\tilde{\phi}_i^j = \phi_i^j - \begin{bmatrix} \frac{\partial \phi_i^j}{\partial dl^j} & \frac{\partial \phi_i^j}{\partial dx^j} & \frac{\partial \phi_i^j}{\partial dr^j} \end{bmatrix} \begin{bmatrix} dl^j \\ dx^j \\ dr^j \end{bmatrix} \quad (18)$$

Where $dl^i$, $dx^i$ and $dr^i$ are respectively the estimated along-track, cross-track and radial satellite orbit errors, e.g., estimated from the optional frame filter. The corrected observation is entered in the Kalman filter.

Ionospheric-free code observation minus iono-free carrier phase is used to observe the ambiguity state directly. The observation formula is the same as (10) above: $P_1^j - \phi_i^j = N_i^j + \epsilon p_i^j$.

For iono-free carrier phase, the observation equation is:

$$\tilde{\phi}_i^j = \rho_i^j + T_i^j + [\, T_i^j \quad 1 \quad 1 \quad -1\,] \begin{bmatrix} Ts_i \\ \delta r_i \\ N_i^j \\ \delta s^j \end{bmatrix} + \epsilon \phi_i^j \quad (19)$$

Where, $\tilde{\phi}_i^j$ is the ionospheric-free carrier phase observation with orbit error corrected, $\rho_i^j$ is the receiver-satellite geometry range, $T_i^j$ is the tropospheric correction computed from standard troposphere model, and $\epsilon \phi_i^j$ is the observation noise.

After updating all the observations of the epoch k, the estimated states and correspondent covariance matrix are obtained using either a standard Kalman filter or a factorized UD form of Kalman filter:

$$\hat{X}_i^k = [\, \hat{X}_{i,u}^k \quad \hat{X}_{i,c}^k\,]^T \quad (20)$$

-continued $$Q_i^k = \begin{bmatrix} Q_{i,u}^k & Q_{i,uc}^k \\ Q_{i,cu}^k & Q_{i,c}^k \end{bmatrix} \quad (21)$$

$$= \begin{bmatrix} U_{i,u}^k & U_{i,uc}^k \\ 0 & U_{i,c}^k \end{bmatrix} \begin{bmatrix} D_{i,u}^k & 0 \\ 0 & D_{i,c}^k \end{bmatrix} \begin{bmatrix} U_{i,u}^k & U_{i,uc}^k \\ 0 & U_{i,c}^k \end{bmatrix}^T$$

The satellite clock error estimates (common states) from all single-station geometry filters and their respective covariance matrix $\hat{X}_{i,c}^k$, $Q_{i,c}^k$ i=1, 2, ... m, are fed into the central fusion master filter as observations. $Q_{i,c}^k$ is a sub-matrix of $Q_i^k$. If the factorized UD form of Kalman filter is used:

$$Q_{i,c}^k = U_{i,c}^k D_{i,c}^k U_{i,c}^{kT} \quad (22)$$

A least-square estimation provides global optimal estimates for the satellite clock states:

$$\hat{X}_{c,k}^M = \left( \sum_{i=1}^m Q_{i,c}^{k-1} \right)^{-1} \left( \sum_{i=1}^m Q_{i,c}^{k-1} X_{i,c}^k \right) \quad (23)$$

and the covariance matrix:

$$Q_{c,k}^M = \left( \sum_{i=1}^m Q_{i,c}^{k-1} \right)^{-1} \quad (24)$$

This approach computes the covariance matrix from the UD form, and converts it back to UD form after the computation when UD factorization is used in the single-station filters.

To avoid these expensive processing operations, the equivalent approach which uses the UD form of Kalman filter directly is preferably implemented. First, the estimates $\hat{X}_{i,c}^k$ from single station geometry filter are transformed to an uncorrelated vector $Z_{i,c}^k$ with the inverse of U matrix:

$$Z_{i,c}^k = U_{i,c}^{k-1} \hat{X}_{i,c}^k \quad (25)$$

And its correspondent variance is the diagonal matrix $D_{i,c}^k$.

The states in the UD filter (which are the satellite clock errors) are reset to 0 and infinite variance before any observation update at each epoch process, the decorrelated observations from each single station filter (eq. 25) can then be put into a UD filter one by one, from all single station filters. It can be proven that the results are the same as using least-squares estimation. The covariance matrix is stored in UD form $U_{c,k}^M$, $D_{c,k}^M$ internally, and the covariance matrix is computed by:

$$Q_{c,k}^M = U_{c,k}^M D_{c,k}^M U_{c,k}^{MT} \quad (26)$$

This part of the processing operation is performed by the central fusion master filter.

Figure 11:
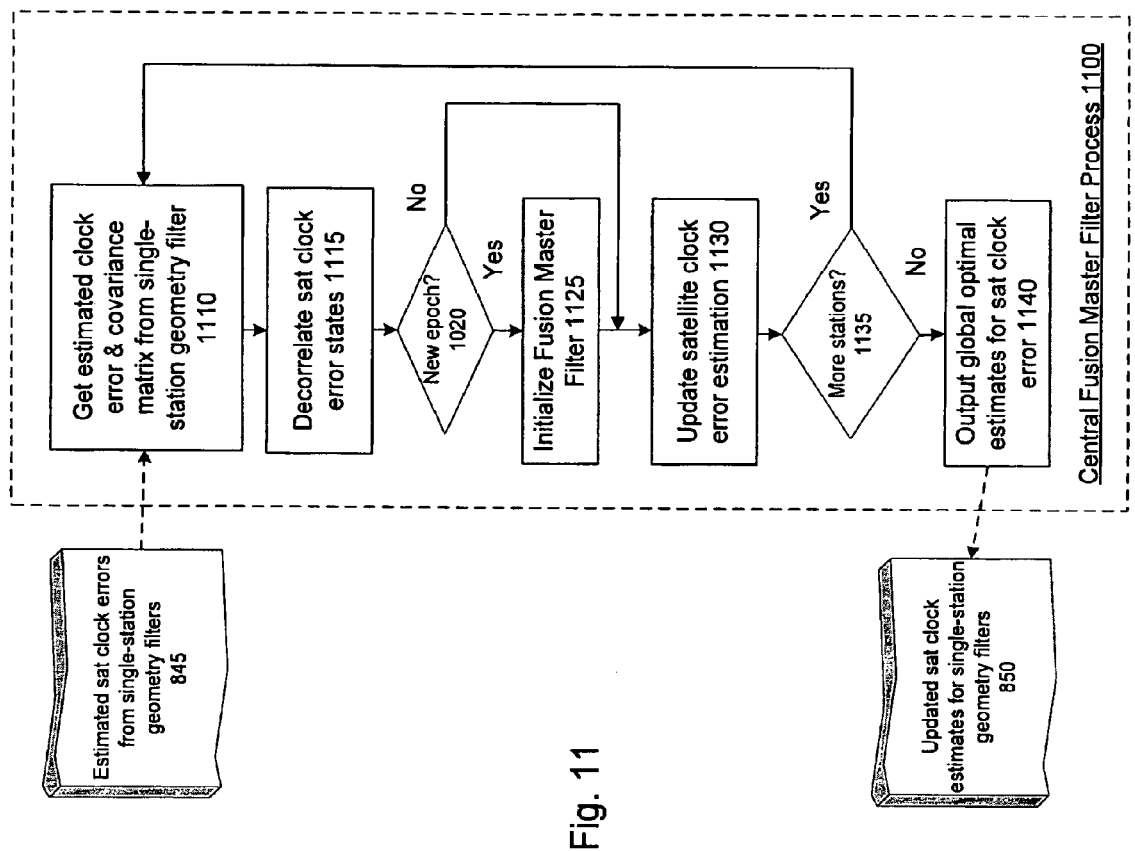
FIG. 11 is a flow chart showing operation of the central fusion master filter of FIG. 8.

FIG. 11 is a flow chart showing operation of the central fusion master filter 815. Estimated satellite-clock errors with covariance matrix 845 are obtained at 1110 from the single-station geometry filters. The clock error states are decorrelated at 1115. A check is made at 1120 whether the data is for a new epoch. If no, the satellite-clock error estimate is updated at 1130. If yes, the central fusion master filter states are initialized at 1125 before updating the satellite-clock error estimates at 1130. A check is made at 1135 whether satellite-clock error estimates are available for more reference stations. If yes, control returns to 1110 to obtain more data. If no, the global optimal satellite clock estimates 850 are supplied at 1140 to the single-station geometry filters.

The central fusion master filter provides global optimized estimates for the satellite clock errors. These global optimized estimates are fed back to each single station geometry filter where they are used to update the local unique states (tropo-scaling, receiver clock error and ambiguities). The estimates and covariance for the satellite clock errors in each single station geometry filter will thus be the same as the central fusion master filter. The local unique states are determined by:

$$\hat{X}_{i,u}^{kM} = \hat{X}_{i,u}^{K} - U_{i,uc}^{k} U_{i,c}^{k-1}(\hat{X}_{c,k}^{M} - \hat{X}_{i,u}^{K}) \tag{27}$$

And the covariance matrix for the $i^{th}$ single station geometry filter is:

$$Q_i^{kM} = \begin{bmatrix} Q_{i,u}^{kM} & Q_{i,uc}^{kM} \\ Q_{i,cu}^{kM} & Q_{c,k}^{M} \end{bmatrix} \tag{28}$$

$$= \begin{bmatrix} U_{i,u}^{k} & U_{i,uc}^{kM} \\ 0 & U_{c,k}^{M} \end{bmatrix} \begin{bmatrix} D_{i,u}^{k} & 0 \\ 0 & D_{c,k}^{M} \end{bmatrix} \begin{bmatrix} U_{i,u}^{k} & U_{i,uc}^{kM} \\ 0 & U_{c,k}^{M} \end{bmatrix}^T$$

Where, $$U_{i,uc}^{kM} = U_{i,uc}^{k} U_{i,c}^{k} U_{c,k}^{M} \tag{29}$$

Equations (27)-(29) give the final estimates of the local states with correspondent covariance matrix in UD form. From Equation (28) are derived $$Q_{c,k}^{M} = U_{c,k}^{M} D_{i,c}^{M} U_{c,k}^{M^T}, \tag{30}$$

which is the same as eq. (26) from the master central fusion filter; and the covariance for the local unique states $$Q_{i,u}^{M} = U_{i,u}^{k} D_{i,u}^{k} U_{i,u}^{k} + U_{i,uc}^{kM} D_{c,k}^{M} U_{i,uc}^{kM^T} \tag{31}$$

and the covariance between local unique states and common states:

$$Q_{i,cu}^{kM} = U_{c,k}^{M} D_{i,c}^{kM} U_{i,uc}^{kM^T} \tag{32}$$

Finally, the estimated iono-free ambiguities and correspondent covariance together with geometry free ambiguities derived from the iono filter, and widelane ambiguities derived from code-carrier filter are combined to resolve double differenced Widelane/Narrowlane ambiguities over the network.

FIG. 12 schematically illustrates a solution for processing of two-carrier GPS signal data in accordance with the invention. Network receivers 1200 supply a set of GPS signal data 1205 having observations of L1 and L2 for multiple satellites GNSS signal data set 1205 are processed in a Network Server process 1210. After passing the signal data through a synchronizer at 1215 they are supplied to separate filter processes: a geometry-free filter process 1220, an ionosphere-free federated geometry filter process 1230, and an optional geometry-free and ionosphere-free code filter process 1240. The filters of geometry-free filter process 1220 use geometry-free ionosphere carrier-phase combinations to obtain an array 1225 of ambiguity estimates for the ionosphere carrier-phase combination and associated statistical information. Ionosphere-free federated geometry filter process 1230 employs a geometry carrier-phase combination to obtain an array 1235 of ambiguity estimates for the geometry carrier-phase combination and associated statistical information. Code filter process 1240 uses geometry-free and ionosphere-free code-carrier combinations to obtain an array 1245 of ambiguity estimates for the geometry-free and ionosphere-free code-carrier combinations and associated statistical information. Arrays 1225, 1235 and 1245 are supplied to a combining process 1250 to obtain an array 1255 of ambiguity estimates for all carrier-phase observations and associated statistical information. Array 1255 is supplied to a computation process 1260 to compute the integer values of the ambiguities. The resolved ambiguities are applied directly to the individual measurements of GPS signals at 1205 to assemble network broadcast data at 1280. This ambiguity free data is streamed to any location within the network as network broadcast data in 1285.

FIG. 13 shows the structure of filters useful in the process of FIG. 12. GPS signal data set 1205 is supplied to a network processor. After synchronization in 1310, they are streamed to a bank of geometry-free filters 1320. GPS signal data set 1205 is supplied to a single ionosphere-free federated geometry filter 1330 which processes the observations of all M observed satellites. GPS signal data set 1205 is optionally supplied to code filter bank 1340. A combiner 1350 bundles the float solution of the different filters, followed by an integer ambiguity resolution at 1360. The ambiguities are applied to the measurements of the reference stations to calculate the errors at the reference stations at 1370. The resolved ambiguities are applied to the synchronized data stream 1205 in a network broadcast assembler at 1380. This ambiguity free data is streamed to any location within the network as network broadcast data in 1285.

FIG. 14 schematically illustrates a three-carrier-frequency scenario, such as proposed for Galileo and for modernized GPS. Receiver 1400 receives GNSS signals from any number of satellites in view, such as SV1, SV2 and SVm, shown respectively at 1410, 1420 and 1430. The signals pass through the earth's atmosphere, shown schematically at 1440. Each signal has three or more frequencies, f1, f2, ... fk. Receiver 1400 determines from the signals a respective pseudo-range, PR1, PR2, PRm, to each of the satellites. Atmospheric and multipath effects cause variations in the signal path, as indicated schematically at 1450, which distort the pseudo-range determinations.

FIG. 15 is a flowchart illustrating a process architecture for computing GNSS position employing factorized ambiguity resolution of GNSS signals for three or more carriers in accordance with an embodiment of the invention. A GNSS signal data set 1505 is obtained by observing signals received from multiple satellites SV1, to SV2, ..., SVM at a plurality of reference stations. GNSS signal data set 1505 is supplied to a processing element 1510 which prepares the data for filtering, and the resulting prepared data 1415 is then supplied to a processing element 1520 which applies fully-factorized carrier-ambiguity-resolution (CAR) filters to the prepared data.

Features and variations of fully-factorized carrier-ambiguity-resolution (CAR) filters are described in United States Patent Application Publication US2005/0101248 A1, published May 12, 2005. If desired the geometry-free filters of the fully-factorized CAR filter are modified by augmenting the state vectors of the geometry-free filters with multipath $(MP_1^m, \ldots, MP_N^m)$ and ionosphere parameters $(I_0^m, a_\lambda^m, a_\phi^m)$ as described in U.S. Provisional Patent Application 60/715, 752. In accordance with embodiments of the present invention, the ionosphere-free filter of the fully-factorized CAR filter is a federated geometry filter as described herein.

The result of applying fully-factorized CAR filter element 1520 to the prepared data is an array 1525 of ambiguity estimates for all carrier-phase observations and associated statistical information for all transmitters (e.g. for all observed GNSS satellites and/or pseudolites). Array 1525 is supplied to an element 1530 that resolves the integer ambiguity. These ambiguities again are used in the computation of errors in the error computing element 1370, which provides the errors at the reference stations at 1535.

FIG. 16 shows the structure of a fully-factorized 3+ carrier ambiguity resolution filter 1620 as modified in accordance with embodiments of the invention and suitable for carrying out filter process 1520. A prepared GNSS signal data set 1615 is supplied to a fully factorized CAR filter 1520, which contains a number of elements for carrying out sub-processes. Element 1625 computes coefficients from the prepared data set which serve to form linear combinations of the observed measurements to be processed in the filter. The prepared data set with computed coefficients is passed to a plurality of sub-filters. These sub-filters include: an ionosphere-free, federated geometry filter 1635; a geometry-free filter bank 1630; one or more Quintessence filter banks 1640(1) to 1640($nf$-2) in which each filter bank has one filter per observed satellite; and one or more code filter banks 1645(1) to 1645($nf$) in which each filter bank has one filter per observed satellite, where nf is the number of GNSS carrier frequencies. Arrays produced by the sub-filters are supplied to a combiner 1650 which provides a combined array 1655 of ambiguity estimates for all carrier phase observations with associated statistical information. Array 1655 is supplied to an element 1660 which resolves ambiguities. The number of Quintessence filter banks is two less than the number nf of carrier frequencies of the GNSS signal data set 1615, as explained in United States Patent Application Publication US2005/0101248 A1.

FIG. 17 schematically illustrates a method in accordance with embodiments of the invention for processing a GNSS signal data set 1705 with three or more carriers. GNSS signal data set 1705 is optionally processed at 1710 to compute coefficients 1715 for use in the subfilters of a fully-factorized 3+ carrier ambiguity resolution filter, such as filter 1720; coefficients 1715 may alternatively be computed in the sub-filters at the cost of somewhat greater processing burden. Computation of the coefficients is described in United States Patent Application Publication US2005/0101248 A1. Sub-filter process 1720 applies to data set 1705 an ionosphere-free filter such as ionosphere-free federated geometry filter 1635 to obtain an array 1725 of ambiguity estimates for the geometry carrier-phase combination and associated statistical information. Sub-filter process 1730 applies to data set 1705 a bank of geometry-frees filters such as geometry-free filter bank 1630 to obtain an array 1635 of ambiguity estimates for the ionosphere carrier-phase combination and associated statistical information. Sub-filter process 1740 applies to data set 1705 at least one bank of Quintessence filters such as Quintessence filter banks 1540(1) . . . 1540($nf$-2) using a geometry-free and ionosphere-free carrier-phase combination to obtain an array 1745 of ambiguity estimates for the geometry-free and ionosphere-free carrier-phase combination and associated statistical information. The number of Quintessence filter banks is dependent on the number of carrier frequencies as discussed in United States Patent Application Publication US2005/0101248 A1. Sub-filter process 1750 applies to data set 1705 at least one code filter bank such as code filter banks 1645(1), . . . 1645($nj$) using a plurality of geometry-free code-carrier combinations to obtain an array 1755 of ambiguity estimates for the code-carrier combinations and associated statistical information for the plurality of transmitters. The number and characteristics of the code filter banks are described in United States Patent Application Publication US2005/0101248 A1. Arrays 1625, 1635, 1645 and 1655 are combined at 1760 to obtain a combined array 1765 of ambiguity estimates for all carrier phase observations and associated statistical. Sub-filter processes 1720, 1730, 1740, 1750 may be carried out in parallel, for example in separate threads within a processor or in separate processors, as desired to optimize considerations such as computational efficiency and/or processor power consumption. Array 1765 is optionally passed to a resolver 1775 which resolves ambiguities. An error computing element 1780 then compares actual measurements with expected measurements at the reference stations, and provides as output an array 1785 of errors at the reference stations.

FIG. 18 shows a mode of operation in accordance with embodiments of the invention in which a plurality of reference stations is employed in a network. Reference receivers 1805, 1810, 1815 each supply reference-station data, for example a formatted multi-band RTK data stream as described in United States Patent Application Publication US2005/0101248 A1, to a network server 1820. In the virtual-reference-station mode the reference-station data is combined by network server 1820 to produce a set of data simulating a reference station for a declared location such as the location of rover receiver 181N.

FIG. 19 shows a mode of operation in accordance with embodiments of the invention in which a plurality of individual reference stations is employed. Reference receivers 1905, 1915, 1925 supply respective reference station data 1910, 1920, 1930 to a network server processor 1935. The network server processor generates network broadcast corrections using the presented federated geometry filter model to help solve ambiguities. The network broadcast corrections 1940 are supplied to a rover receiver 1900 which receives them through a suitable antenna 1945 and data link 1950. If the reference-station data are compressed for efficient transmission via the data link, a data decompression element 1955 within rover receiver 1945 decompresses the reference-station data for use by one or more further processing elements within processor 1945.

Rover receiver 1900 further includes an antenna 1975 for receiving GNSS signals and suitable signal reception and demodulation electronics 1980 for producing rover-receiver carrier phase and pseudorange data 1985 for use in rover processor 1945. Rover processor 1945 includes a data compression element 1955 and a multi-reference station position computation element 1990 for each of the reference stations. Computation element 1990 computes RTK position fixes of rover receiver 1900 and supplies as output data RTK position and status information 1995.

Those of ordinary skill in the art will realize that the detailed description of embodiments of the present invention is illustrative only and is not intended to be in any way limiting. Other embodiments of the present invention will readily suggest themselves to such skilled persons having the benefit of this disclosure. For example, while a minimum-error combination is employed in the examples, those of skill in the art will recognized that many combinations are possible and that a combination other than a minimum-error combination can produce acceptable if less than optimum results; thus the claims are not intended to be limited to minimum-error combinations other than where expressly called for.

Reference is made in detail to implementations of the present invention as illustrated in the accompanying drawings. The same reference indicators are used throughout the drawings and the following detailed description to refer to the same or like parts.

In the interest of clarity, not all of the routine features of the implementations described herein are shown and described. It will be appreciated that in the development of any such actual implementation, numerous implementation-specific decisions must be made to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with embodiments of the present invention, the components, process steps and/or data structures may be implemented using various types of operating systems (OS), computer platforms, firmware, computer programs, computer languages and/or general-purpose machines. The methods can be run as a programmed process running on processing circuitry. The processing circuitry can take the form of numerous combinations of processors and operating systems, or a stand-alone device. The processes can be implemented as instructions executed by such hardware, by hardware alone, or by any combination thereof. The software may be stored on a program storage device readable by a machine. Computational elements, such as filters and banks of filters, can be readily implemented using an object-oriented programming language such that each required filter is instantiated as needed.

Those of skill in the art will recognize that devices of a less general-purpose nature, such as hardwired devices, field programmable logic devices (FPLDs), including field programmable gate arrays (FPGAs) and complex programmable logic devices (CPLDs), application specific integrated circuits (ASICs), or the like, may also be used without departing from the scope and spirit of the inventive concepts disclosed herein.

In accordance with an embodiment of the present invention, the methods may be implemented on a data processing computer such as a personal computer, workstation computer, mainframe computer, or high-performance server running an OS such as Microsoft® Windows® XP and Windows® 2000, available from Microsoft Corporation of Redmond, Wash., or Solaris® available from Sun Microsystems, Inc. of Santa Clara, Calif., or various versions of the Unix operating system such as Linux available from a number of vendors. The methods may also be implemented on a multiple-processor system, or in a computing environment including various peripherals such as input devices, output devices, displays, pointing devices, memories, storage devices, media interfaces for transferring data to and from the processor(s), and the like. Such a computer system or computing environment may be networked locally, or over the Internet.

In addition to the foregoing, embodiments in accordance with the invention may comprise, for example, one or more of the following:

1. A method of processing a set of GNSS signal data received from multiple satellites at multiple reference stations, comprising:
    a. For each reference station, applying to the GNSS signal data a station geometry filter to estimate values for local states representing parameters unique to that reference station and for common states representing parameters common to all reference stations, providing values for the common states and their covariance to a master filter, and preparing updated estimates for the local states when updated values for the common states are provided by a master filter, and
    b. Applying to the values for the common states and their covariances a master filter to estimate updated values for the common states, and to provide the updated values to the station geometry filters.
2. The method of 1, wherein the common states comprise a satellite-clock error for each satellite and the local states comprise a tropospheric scaling factor, a reference-station clock error, and an iono-free ambiguity for each satellite.
3. The method of one of 1-2, further comprising:
    a. Applying to the GNSS signal data from a subset of the reference stations a frame filter to estimate values for frame filter system states representing at least one of: (i) a troposcaling vector having a troposcaling state for each reference station of a subset of the reference stations, (ii) a receiver clock error vector having a receiver clock error state for each reference station of the subset, (iii) an ambiguity vector having an ambiguity state for each satellite for each reference station of the subset, (iv) a satellite clock error vector having a clock error state for each satellite, and (v) an orbit error vector having a set of orbit error states for each satellite, and
    b. Supplying at least a subset of these values to the station geometry filters.
4. The method of 3, wherein the frame filter supplies estimated satellite-orbit error vector values to the station geometry filters.
5. The method of 4, wherein during each of a plurality of epochs the station geometry filters apply the satellite-orbit error values as a correction before estimating values for the local states and the common states.
6. The method of 3 or 4, wherein the frame filter supplies estimated troposcaling values to the station geometry filters.
7. The method of 3 or 4, wherein the frame filter supplies estimated troposcaling values to the station geometry filters during a number of initial epochs of operation of the station geometry filters.
8. The method of one of 1-7, further comprising combining state values from the station geometry filters to obtain an array of ionosphere-free ambiguity estimates and associated statistical information.
9. The method of 8, further comprising:
    Forming a geometry-free combination of the GNSS signal data;
    Applying a bank of geometry-free filters to the geometry-free combination to obtain geometry-free ambiguity estimates and associated statistical information; and
    Combining the ionosphere-free ambiguity estimates and associated statistical information with the geometry-free ambiguity estimates and associated statistical information to determine a combined array of ambiguity estimates and associated statistical information.
10. The method of 8, further comprising:
    Forming a geometry-free combination of the GNSS signal data;
    Applying a bank of geometry-free filters to the geometry-free combination to obtain geometry-free ambiguity estimates and associated statistical information;
    Applying at least one code filter to the GNSS signal data using a plurality of geometry-free code-carrier combinations to obtain ambiguity estimates for the code-carrier combinations and associated statistical information; and Combining the ionosphere-free ambiguity estimates and associated statistical information with the geometry-free ambiguity estimates and associated statistical information and with the ambiguity estimates for all code-carrier combinations and associated statistical information to determine a combined array of ambiguity estimates and associated statistical information.

11. The method of 8, wherein the GNSS signal data is derived from at least three carrier frequencies received at the reference stations over multiple epochs, further comprising:

Forming a geometry-free combination of the GNSS signal data;

Applying a bank of geometry-free filters to the geometry-free combination to obtain geometry-free ambiguity estimates and associated statistical information;

Applying at least one code filter to the GNSS signal data using a plurality of geometry-free code-carrier combinations to obtain ambiguity estimates for the code-carrier combinations and associated statistical information;

Applying at least one quintessence filter to the GNSS signal data using a plurality of geometry-free and ionosphere-free carrier-phase combinations to obtain geometry-free and ionosphere-free ambiguity estimates and associated statistical information; and Combining the ionosphere-free ambiguity estimates and associated statistical information with the geometry-free ambiguity estimates and associated statistical information and with the ambiguity estimates for the code-carrier combinations and associated statistical information and with the geometry-free and ionosphere-free ambiguity estimates and associated statistical information to determine a combined array of ambiguity estimates and associated statistical information.

12. The method of one of 9-11, further comprising:

Computing from the ambiguity estimates for all carrier phase observations a set of errors at the reference stations;

Generating from the set of errors at the reference stations a set of virtual-reference-station data for use by a GNSS receiver at a mobile GNSS receiver location, and Transmitting the set of virtual-reference-station data for use by a GNSS receiver at the mobile GNSS receiver location.

13. The method of one of 9-11, further comprising:

Combining the combined array of ambiguity estimates with the set of GNSS signal data to produce a set of network broadcast data for use by GNSS receivers within the network area, and Transmitting the network broadcast data for use by GNSS receivers within the network area.

14. Apparatus for processing a set of GNSS signal data received from multiple satellites at multiple reference stations, comprising:

a. For each reference station, a station geometry filter having local states representing parameters unique to that reference station and common states representing parameters common to all reference stations, wherein the station geometry filter is operative to estimate values for the local states and for the common states, to provide values for the common states and their covariance to a master filter, and to prepared updated estimates for the local states when updated values for the common states are provided by a master filter, and b. A master filter having common states representing parameters common to all reference stations, the master filter being operative to receive values for the common states and their covariances from the station geometry filters, to estimate from the received values and their covariances updated values for the common states, and to provide the updated values to the station geometry filters.

15. The apparatus of 14, wherein the common states comprise a satellite-clock error for each satellite and the local states comprise a tropospheric scaling factor, a reference-station clock error, and an iono-free ambiguity for each satellite.

16. The apparatus of one of 14-15, further comprising:

c. A frame filter having frame filter system states representing at least one of:
(i) a troposcaling vector having a troposcaling state for each reference station of a subset of the reference stations, (ii) a receiver clock error vector having a receiver clock error state for each reference station of the subset, (iii) an ambiguity vector having an ambiguity state for each satellite for each reference station of the subset, (iv) a satellite clock error vector having a clock error state for each satellite, and (v) an orbit error vector having a set of orbit error states for each satellite, wherein the frame filter is operative to estimate values for the frame filter system states from GNSS signal data received at a subset of the reference stations and to supply at least a subset of these values to the station geometry filters.

17. The apparatus of 16, wherein the frame filter supplies estimated satellite-orbit error vector values to the station geometry filters.

18. The apparatus of 16, wherein during each epoch of operation the station geometry filters apply the satellite-orbit error values as a correction before estimating values for the local states and the common states.

19. The apparatus of 16 or 17, wherein the frame filter supplies estimated troposcaling values to the station geometry filters.

20. The apparatus of 16 or 17, wherein the frame filter supplies estimated troposcaling values to the station geometry filters during a number of initial epochs of operation of the station geometry filters.

21. The apparatus of one of 14-20, wherein the reference stations are distributed over a region and wherein the reference stations of the subset lie substantially about a perimeter of the region.

22. The apparatus of one of 14-20, wherein the master filter computes an optimal weighted least-square estimate of the common states and their covariance.

23. The apparatus of one of 14-20, further comprising:

A processing element to prepare a geometry-free combination of the GNSS signal data;

A filter to obtain from the geometry-free combination ambiguity estimates for the geometry-free carrier-phase combination and associated statistical information; and A combiner to determine ambiguity estimates for all carrier phase observations and associated statistical information by combining the ionosphere-free ambiguity estimates and associated statistical information with the geometry-free ambiguity estimates and associated statistical information to determine a combined array of ambiguity estimates and associated statistical information.

24. The apparatus of one of 14-20, further comprising:
   A processing element to prepare a geometry-free combination of the GNSS signal data;
   A filter to obtain from the geometry-free combination ambiguity estimates for the geometry-free carrier-phase combination and associated statistical information;
   At least one code filter using a plurality of geometry-free code-carrier combinations of the GNSS signal data to obtain ambiguity estimates for the code-carrier combinations and associated statistical information; and
   A combiner to determine ambiguity estimates for all carrier phase observations and associated statistical information by combining the ionosphere-free ambiguity estimates and associated statistical information with the geometry-free ambiguity estimates and associated statistical information and with the code-carrier combinations and associated statistical information to determine a combined array of ambiguity estimates and associated statistical information.

25. The apparatus of one of 14-20, wherein the GNSS signal data is derived from at least three carrier frequencies received at the reference stations over multiple epochs, further comprising:
   A processing element to prepare a geometry-free combination of the GNSS signal data;
   A filter to obtain from the geometry-free combination ambiguity estimates for the geometry-free carrier-phase combination and associated statistical information;
   At least one code filter using a plurality of geometry-free code-carrier combinations of the GNSS signal data to obtain ambiguity estimates for the code-carrier combinations and associated statistical information;
   At least one quintessence filter using a plurality of geometry-free and ionosphere-free carrier-phase combinations of the GNSS signal data to obtain ambiguity estimates for geometry-free and ionosphere-free carrier-phase combinations and associated statistical information; and
   A combiner to determine ambiguity estimates for all carrier phase observations and associated statistical information by combining the ionosphere-free ambiguity estimates and associated statistical information with the geometry-free ambiguity estimates and associated statistical information and with the ambiguity estimates for the code-carrier combinations and associated statistical information and with the ambiguity estimates for geometry-free and ionosphere-free carrier-phase combinations and associated statistical information to determine a combined array of ambiguity estimates and associated statistical information.

26. The apparatus of one of 14-25, further comprising:
   A resolver to compute from the ambiguity estimates for all carrier phase observations a set of errors at the reference stations;
   A processing element to generate from the set of errors at the reference stations a set of virtual-reference-station data for use by a GNSS receiver at a mobile GNSS receiver location.

27. The apparatus of one of 14-20, further comprising:
   A combining element to combine the ambiguity estimates for all carrier phase observations with the set of GNSS signal data to produce a set of network broadcast data for use by GNSS receivers within the network area.

28. A network correction data stream prepared by processing a set of GNSS signal data derived from signals having at least two carrier frequencies and received from two or more satellites at two or more reference stations over multiple epochs, wherein the data stream is prepared by:
   a. For each reference station, applying to the GNSS signal data a station geometry filter to estimate values for local states representing parameters unique to that reference station and for common states representing parameters common to all reference stations, providing values for the common states and their covariance to a master filter, and preparing updated estimates for the local states when updated values for the common states are provided by a master filter;
   b. Applying to the values for the common states and their covariances a master filter to estimate updated values for the common states, and to provide the updated values to the station geometry filters;
   c. Combining states values from the station geometry filters to obtain an array of ionosphere-free ambiguity estimates and associated statistical information;
   d. Forming a geometry-free combination of the GNSS signal data and applying a bank of geometry-free filters to the geometry-free combination to obtain geometry-free ambiguity estimates and associated statistical information; and
   e. Combining the ionosphere-free ambiguity estimates and associated statistical information with the geometry-free ambiguity estimates and associated statistical information to determine a combined array of ambiguity estimates and associated statistical information;
   f. Repeating a.-e. for each of multiple epochs to update the ambiguity estimates and associated statistical information; and
   g. Combining the ambiguity estimates with the set of GNSS signal data to produce a set of network broadcast data for use by GNSS receivers within the network area.

29. A network correction data stream prepared by processing a set of GNSS signal data derived from signals having at least two carrier frequencies and received from two or more satellites at two or more reference stations over multiple epochs, wherein the data stream is prepared by:
   a. For each reference station, applying to the GNSS signal data a station geometry filter to estimate values for local states representing parameters unique to that reference station and for common states representing parameters common to all reference stations, providing values for the common states and their covariance to a master filter, and preparing updated estimates for the local states when updated values for the common states are provided by a master filter;
   b. Applying to the values for the common states and their covariances a master filter to estimate updated values for the common states, and to provide the updated values to the station geometry filters;
   c. Combining states values from the station geometry filters to obtain an array of ionosphere-free ambiguity estimates and associated statistical information;
   d. Forming a geometry-free combination of the GNSS signal data and applying a bank of geometry-free filters to the geometry-free combination to obtain geometry-free ambiguity estimates and associated statistical information;
   e. Applying at least one code filter to the GNSS signal data using a plurality of geometry-free code-carrier combinations to obtain ambiguity estimates for the code-carrier combinations and associated statistical information;
   f. Combining the ionosphere-free ambiguity estimates and associated statistical information with the geometry-free ambiguity estimates and associated statistical information and with the ambiguity estimates for all code-carrier combinations and associated statistical information to determine a combined array of ambiguity estimates and associated statistical information;

g. Repeating a.-f. for each of multiple epochs to update the ambiguity estimates and associated statistical information; and h. Combining the ambiguity estimates with the set of GNSS signal data to produce a set of network broadcast data for use by GNSS receivers within the network area.

30. A network correction data stream prepared by processing a set of GNSS signal data derived from signals having at least two carrier frequencies and received from two or more reference stations over multiple epochs, wherein the data stream is prepared by:

a. For each reference station, applying to the GNSS signal data a station geometry filter to estimate values for local states representing parameters unique to that reference station and for common states representing parameters common to all reference stations, providing values for the common states and their covariance to a master filter, and preparing updated estimates for the local states when updated values for the common states are provided by a master filter;

b. Applying to the values for the common states and their covariances a master filter to estimate updated values for the common states, and to provide the updated values to the station geometry filters;

c. Combining states values from the station geometry filters to obtain an array of ionosphere-free ambiguity estimates and associated statistical information;

d. Forming a geometry-free combination of the GNSS signal data and applying a bank of geometry-free filters to the geometry-free combination to obtain geometry-free ambiguity estimates and associated statistical information;

e. Applying at least one code filter to the GNSS signal data using a plurality of geometry-free code-carrier combinations to obtain ambiguity estimates for the code-carrier combinations and associated statistical information;

f. Applying at least one quintessence filter to the GNSS signal data using a plurality of geometry-free and ionosphere-free carrier-phase combinations to obtain geometry-free and ionosphere-free ambiguity estimates and associated statistical information;

g. Combining the ionosphere-free ambiguity estimates and associated statistical information with the geometry-free ambiguity estimates and associated statistical information and with the ambiguity estimates for the code-carrier combinations and associated statistical information and with the geometry-free and ionosphere-free ambiguity estimates and associated statistical information to determine a combined array of ambiguity estimates and associated statistical information;

h. Repeating a.-g. for each of multiple epochs to update the ambiguity estimates and associated statistical information; and i. Combining the ambiguity estimates with the set of GNSS signal data to produce a set of network broadcast data for use by GNSS receivers within the network area.

31. A virtual-reference-station correction data set prepared by processing a set of GNSS signal data derived from signals having at least two carrier frequencies and received from two or more satellites at two or more reference stations over multiple epochs, wherein the data stream is prepared by:

a. For each reference station, applying to the GNSS signal data a station geometry filter to estimate values for local states representing parameters unique to that reference station and for common states representing parameters common to all reference stations, providing values for the common states and their covariance to a master filter, and preparing updated estimates for the local states when updated values for the common states are provided by a master filter;

b. Applying to the values for the common states and their covariances a master filter to estimate updated values for the common states, and to provide the updated values to the station geometry filters;

c. Combining state values from the station geometry filters to obtain an array of ionosphere-free ambiguity estimates and associated statistical information;

d. Forming a geometry-free combination of the GNSS signal data and applying a bank of geometry-free filters to the geometry-free combination to obtain geometry-free ambiguity estimates and associated statistical information;

e. Combining the ionosphere-free ambiguity estimates and associated statistical information with the geometry-free ambiguity estimates and associated statistical information to determine a combined array of ambiguity estimates and associated statistical information;

f. Repeating a.-e. for each of multiple epochs to update the ambiguity estimates and associated statistical information; and g. Combining the ambiguity estimates with the set of GNSS signal data to produce a set of correction data for use by a GNSS receiver at a mobile GNSS receiver location within the network area.

32. A virtual-reference-station correction data set prepared by processing a set of GNSS signal data derived from signals having at least two carrier frequencies and received from two or more satellites at two or more reference stations over multiple epochs, wherein the data set is prepared by:

a. For each reference station, applying to the GNSS signal data a station geometry filter to estimate values for local states representing parameters unique to that reference station and for common states representing parameters common to all reference stations, providing values for the common states and their covariance to a master filter, and preparing updated estimates for the local states when updated values for the common states are provided by a master filter;

b. Applying to the values for the common states and their covariances a master filter to estimate updated values for the common states, and to provide the updated values to the station geometry filters;

c. Combining states values from the station geometry filters to obtain an array of ionosphere-free ambiguity estimates and associated statistical information;

d. Forming a geometry-free combination of the GNSS signal data and applying a bank of geometry-free filters to the geometry-free combination to obtain geometry-free ambiguity estimates and associated statistical information;

e. Applying at least one code filter to the GNSS signal data using a plurality of geometry-free code-carrier combinations to obtain ambiguity estimates for the code-carrier combinations and associated statistical information;

f. Combining the ionosphere-free ambiguity estimates and associated statistical information with the geometry-free ambiguity estimates and associated statistical information and with the ambiguity estimates for all code-carrier combinations and associated statistical information to determine a combined array of ambiguity estimates and associated statistical information;

g. Repeating a.-f for each of multiple epochs to update the ambiguity estimates and associated statistical information; and h. Combining the ambiguity estimates with the set of GNSS signal data to produce a set of correction data for use by a GNSS receiver at a mobile GNSS receiver location within the network area.

33. A virtual-reference-station correction data set prepared by processing a set of GNSS signal data derived from signals having at least two carrier frequencies and received from two or more satellites at two or more reference stations over multiple epochs, wherein the data stream is prepared by:

a. For each reference station, applying to the GNSS signal data a station geometry filter to estimate values for local states representing parameters unique to that reference station and for common states representing parameters common to all reference stations, providing values for the common states and their covariance to a master filter, and preparing updated estimates for the local states when updated values for the common states are provided by a master filter;

b. Applying to the values for the common states and their covariances a master filter to estimate updated values for the common states, and to provide the updated values to the station geometry filters;

c. Combining states values from the station geometry filters to obtain an array of ionosphere-free ambiguity estimates and associated statistical information;

d. Forming a geometry-free combination of the GNSS signal data and applying a bank of geometry-free filters to the geometry-free combination to obtain geometry-free ambiguity estimates and associated statistical information;

e. Applying at least one code filter to the GNSS signal data using a plurality of geometry-free code-carrier combinations to obtain ambiguity estimates for the code-carrier combinations and associated statistical information;

f. Applying at least one quintessence filter to the GNSS signal data using a plurality of geometry-free and iono-sphere-free carrier-phase combinations to obtain geometry-free and ionosphere-free ambiguity estimates and associated statistical information;

g. Combining the ionosphere-free ambiguity estimates and associated statistical information with the geometry-free ambiguity estimates and associated statistical information and with the ambiguity estimates for the code-carrier combinations and associated statistical information and with the geometry-free and ionosphere-free ambiguity estimates and associated statistical information to determine a combined array of ambiguity estimates and associated statistical information;

h. Repeating a.-g. for each of multiple epochs to update the ambiguity estimates and associated statistical information; and i. Combining the ambiguity estimates with the set of GNSS signal data to produce a set of correction data for use by a GNSS receiver at a mobile GNSS receiver location within the network area.

The invention claimed is:

1. A method of processing a set of GNSS signal data received from multiple satellites at multiple reference stations, comprising:

a. for each reference station,
applying to the GNSS signal data a station geometry filter to estimate values for local states representing parameters unique to that reference station and for common states representing parameters common to all reference stations,
providing values for the common states and their covariance to a master filter, and
preparing updated estimates for the local states when updated values for the common states are provided by the master filter, and b. applying to the values for the common states and their covariances the master filter to estimate updated values for the common states, and to provide the updated values to the station geometry filters.

2. The method of claim 1, wherein
the common states comprise a satellite-clock error for each satellite and
the local states comprise a tropospheric scaling factor, a reference-station clock error, and an iono-free ambiguity for each satellite.

3. The method of claim 1, further comprising:

a. applying to the GNSS signal data from a subset of the reference stations a frame filter to estimate values for frame filter system states representing at least one of:
(i) a troposcaling vector having a troposcaling state for each reference station of a subset of the reference stations,
(ii) a receiver clock error vector having a receiver clock error state for each reference station of the subset,
(iii) an ambiguity vector having an ambiguity state for each satellite for each reference station of the subset,
(iv) a satellite clock error vector having a clock error state for each satellite, and
(v) an orbit error vector having a set of orbit error states for each satellite, and b. supplying at least a subset of the estimated values for the frame filter states to the station geometry filters.

4. The method of claim 3, wherein the frame filter supplies estimated satellite-orbit error vector values to the station geometry filters.

5. The method of claim 4, wherein during each of a plurality of epochs the station geometry filters apply the satellite-orbit error values as a correction before estimating values for the local states and the common states.

6. The method of claim 3, wherein the frame filter supplies estimated troposcaling values to the station geometry filters.

7. The method of claim 3, wherein the frame filter supplies estimated troposcaling values to the station geometry filters during a number of initial epochs of operation of the station geometry filters.

8. The method of claim 1, further comprising combining state values from the station geometry filters to obtain an array of ionosphere-free ambiguity estimates and associated statistical information.

9. The method of claim 8, further comprising:
forming a geometry-free combination of the GNSS signal data;
applying a bank of geometry-free filters to the geometry-free combination to obtain geometry-free ambiguity estimates and associated statistical information; and
combining the ionosphere-free ambiguity estimates and associated statistical information with the geometry-free ambiguity estimates and associated statistical information to determine a combined array of ambiguity estimates and associated statistical information.

10. The method of claim 9, further comprising:
computing from the ambiguity estimates for all carrier phase observations a set of errors at the reference stations;

generating from the set of errors at the reference stations a set of virtual-reference-station data for use by a GNSS receiver at a mobile GNSS receiver location, and transmitting the set of virtual-reference-station data for use by a GNSS receiver at the mobile GNSS receiver location.

11. The method of claim 9, further comprising:

combining the combined array of ambiguity estimates with the set of GNSS signal data to produce a set of network broadcast data for use by GNSS receivers within the network area, and transmitting the network broadcast data for use by GNSS receivers within the network area.

12. The method of claim 8, further comprising:

forming a geometry-free combination of the GNSS signal data;

applying a bank of geometry-free filters to the geometry-free combination to obtain geometry-free ambiguity estimates and associated statistical information;

applying at least one code filter to the GNSS signal data using a plurality of geometry-free code-carrier combinations to obtain ambiguity estimates for the code-carrier combinations and associated statistical information; and combining the ionosphere-free ambiguity estimates and associated statistical information with the geometry-free ambiguity estimates and associated statistical information and with the ambiguity estimates for all code-carrier combinations and associated statistical information to determine a combined array of ambiguity estimates and associated statistical information.

13. The method of claim 8, wherein the GNSS signal data is derived from at least three carrier frequencies received at the reference stations over multiple epochs, further comprising:

forming a geometry-free combination of the GNSS signal data;

applying a bank of geometry-free filters to the geometry-free combination to obtain geometry-free ambiguity estimates and associated statistical information;

applying at least one code filter to the GNSS signal data using a plurality of geometry-free code-carrier combinations to obtain ambiguity estimates for the code-cater combinations and associated statistical information;

applying at least one quintessence filter to the GNSS signal data using a plurality of geometry-free and ionosphere-free carrier-phase combinations to obtain geometry-free and ionosphere-free ambiguity estimates and associated statistical information; and combining the ionosphere-free ambiguity estimates and associated statistical information with the geometry-free ambiguity estimates and associated statistical information and with the ambiguity estimates for the code-cater combinations and associated statistical information and with the geometry-free and ionosphere-free ambiguity estimates and associated statistical information to determine a combined array of ambiguity estimates and associated statistical information.

14. Apparatus for processing a set of GNSS signal data received from multiple satellites at multiple reference stations, comprising:

a. for each reference station, a station geometry filter having local states representing parameters unique to that reference station and common states representing parameters common to all reference stations, wherein the station geometry filter is operative to estimate values for the local states and for the common states, to provide values for the common states and their covariance to a master filter, and to prepare updated estimates for the local states when updated values for the common states are provided by the master filter, and b. the master filter having common states representing parameters common to all reference stations, the master filter being operative to receive values forte common states and their covariances from the station geometry filters, to estimate from the received values and their covariances updated values for the common states, and to provide the updated values to the station geometry filters.

15. The apparatus of claim 14, wherein the common states comprise a satellite-clock error for each satellite and the local states comprise a tropospheric scaling factor, a reference-station clock error, and an iono-free ambiguity for each satellite.

16. The apparatus of claim 14, further comprising:

c. a frame filter having frame filter system states representing at least one of:

(i) a troposcaling vector having a troposcaling state for each reference station of a subset of the reference stations, (ii) a receiver clock error vector having a receiver clock error state for each reference station of the subset, (iii) an ambiguity vector having an ambiguity state for each satellite for each reference station of the subset, (iv) a satellite clock error vector having a clock error state for each satellite, and (v) an orbit error vector having a set of orbit error states for each satellite, wherein the frame filter is operative to estimate values for the frame filter system states from GNSS signal data received at a subset of the reference stations and to supply at least a subset of the estimated values for the frame filter system states to the station geometry filters.

17. The apparatus of claim 16, wherein the frame filter supplies estimated satellite-orbit error vector values to the station geometry filters.

18. The apparatus of claim 16, wherein during each epoch of operation the station geometry filters apply the satellite-orbit error values as a correction before estimating values for the local states and the common states.

19. The apparatus of claim 16, wherein the frame filter supplies estimated troposcaling values to the station geometry filters.

20. The apparatus of claim 16, wherein the frame filter supplies estimated troposcaling values to the station geometry filters during a number of initial epochs of operation of the station geometry filters.

21. The apparatus of claim 14, wherein the reference stations are distributed over a region and wherein the reference stations of the subset lie substantially about a perimeter of the region.

22. The apparatus of claim 14, wherein the master filter computes an optimal weighted least-square estimate of the common states and their covariance.

23. The apparatus of claim 14, further comprising:

a processing element to prepare a geometry-free combination of the GNSS signal data;

a filter to obtain from the geometry-free combination ambiguity estimates for the geometry-free carrier-phase combination and associated statistical information; and a combiner to determine ambiguity estimates for all carrier phase observations and associated statistical information by combining the ionosphere-free ambiguity estimates and associated statistical information with the geometry-free ambiguity estimates and associated statistical information to determine a combined array of ambiguity estimates and associated statistical information.

24. The apparatus of claim 14, further comprising:
a processing element to prepare a geometry-free combination of the GNSS signal data;
a filter to obtain from the geometry-free combination ambiguity estimates for the geometry-free carrier-phase combination and associated statistical information;
at least one code filter using a plurality of geometry-free code-cater combinations of the GNSS signal data to obtain ambiguity estimates for the code-carrier combinations and associated statistical information; and
a combiner to determine ambiguity estimates for all cater phase observations and associated statistical information by combining the ionosphere-free ambiguity estimates and associated statistical information with the geometry-free ambiguity estimates and associated statistical information and with the code-cater combinations and associated statistical information to determine a combined array of ambiguity estimates and associated statistical information.

25. The apparatus of claim 14, wherein the GNSS signal data is derived from at least three carrier frequencies received at the reference stations over multiple epochs, further comprising:
a processing element to prepare a geometry-free combination of the GNSS signal data;
a filter to obtain from the geometry-free combination ambiguity estimates for the geometry-free carrier-phase combination and associated statistical information;
at least one code filter using a plurality of geometry-free code-carrier combinations of the GNSS signal data to obtain ambiguity estimates for the code-carrier combinations and associated statistical information;
at least one quintessence filter using a plurality of geometry-free and ionosphere-free carrier-phase combinations of the GNSS signal data to obtain ambiguity estimates for geometry-free and ionosphere-free carrier-phase combinations end associated statistical information; and
a combiner to determine ambiguity estimates for all carrier phase observations and associated statistical information by combining the ionosphere-free ambiguity estimates and associated statistical information with the geometry-free ambiguity estimates and associated statistical information and with the ambiguity estimates for the code-carrier combinations and associated statistical information and with the ambiguity estimates for geometry-free and ionosphere-free carrier-phase combinations and associated statistical information to determine a combined array of ambiguity estimates and associated statistical information.

26. The apparatus of claim 14, further comprising:
a resolver to compute from the ambiguity estimates for all cater phase observations a set of errors at the reference stations;
a processing element to generate from the set of errors at the reference stations a set of virtual-reference-station data for use by a GNSS receiver at a mobile GNSS receiver location.

27. The apparatus of claim 14, further comprising:
a combining element to combine the ambiguity estimates for all carrier phase observations with the set of GNSS signal data to produce a set of network broadcast data for use by GNSS receivers within the network area.

* * * * *